United States Patent
Crouse

(10) Patent No.: US 10,746,586 B2
(45) Date of Patent: Aug. 18, 2020

(54) TANK-IN-TANK CONTAINER FILL LEVEL INDICATOR

(71) Applicant: SONICU, LLC, Greenfield, IN (US)

(72) Inventor: Kent Eldon Crouse, Greenfield, IN (US)

(73) Assignee: Sonicu, LLC, Greenfield, IN (US)

(*) Notice: Subject to any disclaimer, the term of this patent is extended or adjusted under 35 U.S.C. 154(b) by 232 days.

(21) Appl. No.: 15/168,005

(22) Filed: May 28, 2016

(65) Prior Publication Data

US 2016/0349097 A1  Dec. 1, 2016

Related U.S. Application Data

(60) Provisional application No. 62/167,376, filed on May 28, 2015, provisional application No. 62/338,166, filed on May 18, 2016.

(51) Int. Cl.
*G01F 23/296* (2006.01)
*F17C 13/02* (2006.01)
(Continued)

(52) U.S. Cl.
CPC .......... *G01F 23/2966* (2013.01); *F17C 1/005* (2013.01); *F17C 1/04* (2013.01); *F17C 1/12* (2013.01); *F17C 13/003* (2013.01); *F17C 13/02* (2013.01); *F17C 13/028* (2013.01); *G01F 23/284* (2013.01); *G06Q 10/087* (2013.01);
(Continued)

(58) Field of Classification Search
None
See application file for complete search history.

(56) References Cited

U.S. PATENT DOCUMENTS 3,163,843 A   12/1964  Dieckamp
4,679,430 A    7/1987  Scott-Krestin et al.
(Continued)

FOREIGN PATENT DOCUMENTS

CN       683208    1/1994
CN     102705955   1/2016
(Continued)

OTHER PUBLICATIONS

Final Office Action dated May 31, 2017 in U.S. Appl. No. 15/168,008.
(Continued)

*Primary Examiner* — John C Kuan
(74) *Attorney, Agent, or Firm* — Frost Brown Todd LLC; Dennis S. Schell

(57) ABSTRACT

A tank-in-tank fill level indicator, making use of noninvasive tank-in-tank measuring techniques. A vibration device, such as an exciter or resonator, vibrates the outer tank at its natural frequency of vibration, thereby inducing the vibration of the inner tank and a beating effect as a result of the interaction of the vibrations of the two tanks. A vibration detection device, such as an accelerometer, detects the resultant beating effect of the two tanks' induced vibrations. A data processing device, such as a microcontroller, processes the detection data to obtain the liquid volume. A display, wired or wireless data transmission device, or combination thereof, is then used to provide tank or container fill-level information.

41 Claims, 16 Drawing Sheets

(51) Int. Cl.

| | | |
|---|---|---|
| *F17C 1/00* | (2006.01) | |
| *F17C 13/00* | (2006.01) | |
| *F17C 1/12* | (2006.01) | |
| *F17C 1/04* | (2006.01) | |
| *G01F 23/284* | (2006.01) | |
| *G06Q 10/08* | (2012.01) | |
| *B67D 1/00* | (2006.01) | |
| *B67D 1/04* | (2006.01) | |

(52) U.S. Cl.
CPC ............ *B67D 1/008* (2013.01); *B67D 1/0406* (2013.01); *B67D 2001/0092* (2013.01); *F17C 2201/0104* (2013.01); *F17C 2201/032* (2013.01); *F17C 2201/056* (2013.01); *F17C 2203/0391* (2013.01); *F17C 2203/0629* (2013.01); *F17C 2205/058* (2013.01); *F17C 2209/2163* (2013.01); *F17C 2221/013* (2013.01); *F17C 2223/0153* (2013.01); *F17C 2223/033* (2013.01); *F17C 2250/032* (2013.01); *F17C 2250/034* (2013.01); *F17C 2250/0417* (2013.01); *F17C 2250/0426* (2013.01); *F17C 2250/0465* (2013.01); *F17C 2250/0491* (2013.01); *F17C 2250/0495* (2013.01); *F17C 2260/024* (2013.01); *F17C 2270/0745* (2013.01)

(56) References Cited

U.S. PATENT DOCUMENTS

| | | | |
|---|---|---|---|
| 4,749,988 A | 6/1988 | Berman et al. | |
| 4,782,215 A | 11/1988 | Kadwell et al. | |
| 5,438,868 A | 8/1995 | Holden et al. | |
| 5,686,658 A | 11/1997 | Boren | |
| 5,755,136 A * | 5/1998 | Getman | G01F 23/2961 340/618 |
| 5,844,992 A | 12/1998 | Boyer | |
| 5,983,198 A | 11/1999 | Mowery et al. | |
| 6,023,178 A * | 2/2000 | Shioya | H02M 3/33523 327/176 |
| 6,192,752 B1 | 2/2001 | Blaine | |
| 6,203,184 B1 | 3/2001 | O'Callaghan | |
| 6,330,823 B1 | 12/2001 | Raymond | |
| 6,411,891 B1 | 6/2002 | Jones | |
| 6,672,155 B2 | 1/2004 | Muller et al. | |
| 6,751,602 B2 | 6/2004 | Kotoulas et al. | |
| 6,795,823 B1 | 9/2004 | Aklepi et al. | |
| 6,925,868 B2 | 8/2005 | Young | |
| 7,021,142 B2 | 4/2006 | Roark | |
| 7,114,390 B2 | 10/2006 | Lizon et al. | |
| 7,216,536 B2 | 5/2007 | Young | |
| 7,499,250 B2 | 3/2009 | Zhang | |
| 7,689,394 B2 | 3/2010 | Furem et al. | |
| 7,819,003 B2 | 10/2010 | Breed et al. | |
| 7,894,938 B1 | 2/2011 | Arora et al. | |
| 8,516,568 B2 | 8/2013 | Cohen | |
| 8,532,839 B2 | 9/2013 | Drees et al. | |
| 8,708,883 B2 | 4/2014 | Ten et al. | |
| 8,774,368 B2 | 7/2014 | Bentley et al. | |
| 8,798,913 B2 | 8/2014 | Humphrey | |
| 8,995,670 B2 | 3/2015 | Lambert | |
| 9,057,638 B2 | 6/2015 | Cameron | |
| 9,129,223 B1 | 9/2015 | Velusamy et al. | |
| 9,221,667 B2 | 12/2015 | Hershberger | |
| 9,285,802 B2 | 3/2016 | Arensmeier | |
| 2001/0042574 A1 | 11/2001 | Reynolds | |
| 2003/0172745 A1 | 9/2003 | Mitchinson | |
| 2004/0149030 A1 | 8/2004 | Heilig | |
| 2004/0220844 A1 | 11/2004 | Sanville et al. | |
| 2005/0204820 A1 * | 9/2005 | Treiber | G01N 29/14 73/649 |
| 2007/0251461 A1 | 11/2007 | Reichard et al. | |
| 2008/0104969 A1 | 5/2008 | Heise et al. | |

| | | |
|---|---|---|
| 2008/0156092 A1 | 7/2008 | Boiarski |
| 2008/0159547 A1 | 7/2008 | Schuler et al. |
| 2009/0218980 A1 | 9/2009 | Bilac et al. |
| 2009/0243863 A1 | 10/2009 | Lease |
| 2011/0146803 A1 | 6/2011 | Wu |
| 2011/0217624 A1 | 9/2011 | Zhou et al. |
| 2011/0272043 A1 | 11/2011 | Hollingsworth et al. |
| 2012/0132656 A1 | 5/2012 | Nakken et al. |
| 2013/0033381 A1 | 2/2013 | Breed |
| 2013/0312494 A1 | 11/2013 | Nishimura |
| 2013/0314244 A1 | 11/2013 | Hershberger |
| 2014/0096863 A1 | 4/2014 | Herrmann |
| 2014/0262134 A1 | 9/2014 | Arensmeier et al. |
| 2014/0282944 A1 | 9/2014 | Li |
| 2015/0029001 A1 | 1/2015 | Pleshek |
| 2015/0109143 A1 | 4/2015 | Hershberger |
| 2015/0110276 A1 | 4/2015 | Gereb |
| 2015/0142621 A1 | 5/2015 | Gray |
| 2015/0152451 A1 | 8/2015 | Park |
| 2015/0223646 A1 | 8/2015 | Wegelin et al. |
| 2015/0245139 A1 | 8/2015 | Park |
| 2015/0253231 A1 | 9/2015 | Gao |
| 2015/0306335 A1 | 10/2015 | Winski |
| 2015/0326680 A1 | 11/2015 | Farahani |
| 2015/0341302 A1 | 11/2015 | Balachandran et al. |
| 2015/0346017 A1 | 12/2015 | Leport |
| 2015/0350799 A1 | 12/2015 | Schnaare |
| 2016/0059412 A1 | 3/2016 | Oleynik |
| 2016/0134949 A1 | 5/2016 | Kekalainen |
| 2016/0264394 A1 | 9/2016 | Hershberger |
| 2016/0286993 A1 | 10/2016 | Pau |
| 2016/0299511 A1 | 10/2016 | de Kontz et al. |

FOREIGN PATENT DOCUMENTS

| | | |
|---|---|---|
| EP | 63584 | 11/1982 |
| EP | 119790 | 9/1984 |
| EP | 1215471 | 6/2002 |
| EP | 0837294 | 4/2006 |
| GB | 2164180 | 3/1986 |
| JP | 4018374 | 12/2007 |
| WO | 2009118542 | 10/2009 |
| WO | 2011051949 | 5/2011 |
| WO | 2014197542 | 12/2014 |
| WO | 2015124892 | 8/2015 |
| WO | 2015191722 | 12/2015 |

OTHER PUBLICATIONS

Office Action issued by the USPTO dated Mar. 1, 2018 for U.S. Appl. No. 15/168,008.
Analog Devices, "Small, Low Power, 3-Axis 3 g Accelerometer ADXL335, Data Sheet" (2009).
Diodes Incorporated, "2.5 W Filterless Class-D Mono Audio Amplifier; Data Sheet", Apr. 2013.
Freescale Semiconductor, Inc., "Miniature I2C Digital Barometer; Data Sheet", Feb. 2013.
Silicon Labs, "I 2 C Humidity and Temperature Sensor Si7021-A20;Data Sheet", Jun. 2015.
Solomon Systech, "128 x 64 Dot Matrix OLED/PLED Segment/Common Diver with Controller; SSD1306 Data Sheet", Apr. 2008.
Univision Technology Inc., "OEL Display Module Product Specification; Data Sheet", Jun. 5, 2009.
IKEG LLC,How does KegData Work?, Retrieved from http://www.kegdata.com/about-keg-data (2015).
Apgsensors, Tank Cloud Remote Tank Level Monitoring, 2014-2016 (Copyright); Retrieved from https://www.apgsensors.com/remote-monitoring.
Tempalert, Wireless Sensor, 2016, Retrieved from http://shop.tempalert.com/wireless-temperature-sensor.aspx.
Netbiter, Remote Monitoring of Tanks, 2016, Retrieved from https://www.netbiter.com/applications/water-and-wastewater/tank-monitoring.
Mike Sherer, Remote Beer Dispensing for Fun and Profit, Dec. 30, 2012, Retrieved from http://www.micromatic.com/Remote-Beer-Dispensing-for-Fun-and-Profit.

(56) References Cited

OTHER PUBLICATIONS

Valarm, Remote Tank Monitoring in Real-Time, 2016, Retrieved from http://www.valarm.net/blog/remote-tank-monitoring-in-real-time/.
M2MSOLUTIONS, Ground Fuel Tank & Water Tank Level Remote Monitoring, 2015, Retrieved from http://www.m2m-solutions.rs/index.php/m2m-solutions/tank-level-monitoring.html.
Tanklink, Tanklink CaseStudy, Jul. 2015.
Victoria J. Hodge, Simon O'Keefe, Michael Weeks, Anthony Moulds, Wireless Sensor Networks for Condition Monitoring in the Railway Industry: A Survey; Jun. 3, 2015, Retrieved from: http://ieeexplore.ieee.org/stamp/stamp.jsp?reload=true&arnumber=6963375.
Dalia Kriksciuniene, Tomas Pitner, Adam Kucera, Data Analysis in The Intelligent Building Environment, vol. 11 No. 1, pp. 1-17, 2014.
Jinzhu Chen, Yu Wang, Guoliang Xing, Dirk Colbry, A Sensor System for High Fidelity Temperature Distribution Forecasting in Data Centers, 2014.
Yuebin Yu, Denchai Woradechjumroen, Daihong Y, A Review of Fault Detection and Diagnosis Methodologies on Air Handling Units, 2013, from http://digitalcommons.unl.edu/cgi/viewcontent.cgi?article=1085&context=archengfacpub.
United States Office Action for U.S. Appl. No. 15/168,008, dated Nov. 2, 2016.

\* cited by examiner

$CO_2$ Tank Level

| Driver | Route | Tank | Level | Status | Est. Days Remaining |
|---|---|---|---|---|---|
| Driver 1 | Route 1 | Tank 030 | 15% | Low | 4 |
| Driver 1 | Route 1 | Tank 007 | 35% | Low | 9 |
| Driver 1 | Route 1 | Tank 021 | 17% | Low | 10 |
| Driver 1 | Route 1 | Tank 008 | 85% | OK | 15 |
| Driver 1 | Route 1 | Tank 030 | 16% | OK | 11 |
| Driver 1 | Route 1 | Tank 091 | 25% | OK | 17 |
| Driver 1 | Route 1 | Tank 005 | 80% | OK | 20 |
| Driver 1 | Route 1 | Tank 018 | 64% | OK | 26 |
| Driver 1 | Route 1 | Tank 033 | 23% | Good | 21 |
| Driver 1 | Route 1 | Tank 024 | 90% | Good | 23 |
| Driver 1 | Route 1 | Tank 012 | 81% | Good | 26 |
| Driver 1 | Route 1 | Tank 009 | 96% | Good | 28 |
| Driver 1 | Route 1 | Tank 009 | 50% | Good | 27 |
| Driver 1 | Route 1 | Tank 026 | 88% | Good | 28 |
| Driver 1 | Route 1 | Tank 029 | 46% | Good | 28 |
| Driver 1 | Route 1 | Tank 014 | 62% | Good | 30 |
| Driver 1 | Route 1 | Tank 028 | 31% | Good | 30 |
| Driver 1 | Route 1 | Tank 001 | 100% | Good | 31 |
| Driver 1 | Route 1 | Tank 027 | 82% | Good | 33 |
| Driver 1 | Route 1 | Tank 056 | 57% | Good | 35 |
| Driver 1 | Route 1 | Tank 037 | 69% | Good | 36 |
| Driver 1 | Route 1 | Tank 004 | 62% | Good | 39 |
| Driver 1 | Route 1 | Tank 032 | 40% | Good | 39 |
| Driver 1 | Route 1 | Tank 013 | 58% | Good | 40 |
| Driver 1 | Route 1 | Tank 034 | 52% | Good | 51 |
| Driver 1 | Route 1 | Tank 015 | 86% | Good | 52 |
| Driver 1 | Route 1 | Tank 017 | 92% | Good | 55 |
| Driver 1 | Route 1 | Tank 008 | 50% | Good | 58 |

FIG. 14

TANK-IN-TANK CONTAINER FILL LEVEL INDICATOR

CROSS-REFERENCE TO RELATED APPLICATIONS

The application claims the benefit of U.S. Provisional Patent Application No. 62/167,376, filed May 28, 2015, and titled TANK-IN-TANK CONTAINER FILL LEVEL INDICATOR, and U.S. Provisional Patent Application No. 62/338,166, filed May 18, 2016, and titled TANK-IN-TANK CONTAINER FILL LEVEL INDICATOR, which are incorporated herein by reference.

TECHNICAL FIELD

The present disclosure relates generally to devices and methods for measuring the fill level of liquid or gas in a tank-in-tank container and, more particularly, to devices designed to measure the volume of liquid or gas in a tank-in-tank container in a noninvasive manner.

BACKGROUND

Restaurants and bars use gas, such as carbon dioxide, to carbonate fountain soft drinks and to preserve and push draught beer. Many restaurants have abandoned high-pressure compressed gas cylinders and are now using liquid bulk carbon dioxide as a safer, low-pressure alternative. Liquid bulk carbon dioxide is stored on the premises at a lower pressure in a holding container, and is often refilled on a regular schedule based on a restaurant or bar's usage pattern. The containers are typically a tank-in-tank design, having a rigid outer tank and a rigid inner tank with some amount of insulating space between the outer and inner tanks, and are permanently installed at their respective locations. Bulk carbon dioxide container systems are available in different sizes, ranging from 200 pounds to almost 800 pounds of carbon dioxide capacity, to fit the needs of the individual restaurant or bar.

Carbon dioxide is a compound formed by the combination of carbon and oxygen atoms in a 1:2 ratio expressed by the chemical symbol $CO_2$. The weight percentages of carbon and oxygen are 27.3% and 72.7% respectively. Carbon dioxide is a gas at normal atmospheric temperature and pressure. It is colorless, essentially odorless, and about one and a half times denser than air. Depending on the temperature and pressure to which it is subjected, carbon dioxide may exist in the form of a solid, a liquid, or a gas. At a temperature of −69.90 degrees Fahrenheit and a pressure of 60.43 psig carbon dioxide can exist simultaneously in all three phases. This condition is known as the triple point. At temperatures above 87.90 degrees Fahrenheit carbon dioxide can exist only as a gas, regardless of the pressure. This is known as its critical temperature. Liquid carbon dioxide can only exist in a sealed container between the triple point and critical point temperatures under pressure. There is a definite pressure-temperature relationship of the liquid and gas in equilibrium. Normal operational pressures should remain above 165 psig to prevent the liquid carbon dioxide temperature from dropping below the minimum vessel design temperature. Liquid carbon dioxide should never be stored at pressures below 60.5 psig to prevent the formation of solid carbon dioxide or dry ice.

Carbon dioxide storage tanks are designed for long-term storage of liquefied carbon dioxide. A typical carbon dioxide storage tank is comprised of a steel inner tank encased in an outer steel vacuum shell. The insulation system between the inner and outer containers consists of multiple layer composite insulation and high vacuum to ensure long holding time. The insulation system, designed for long-term vacuum retention, is permanently sealed to ensure vacuum integrity.

A problem often experienced by bulk-fill providers relates to the scheduling of bulk container filling. Holidays or weekends can affect carbon dioxide consumption rates in an irregular manner, making it difficult to accurately predict an out-of-gas situation. This problem is compounded by a common issue where the pre-existing container fill level gauges are broken or inaccurate, although the tanks themselves are otherwise fully functional. A broken fill level gauge can occur when a given container reaches an empty, or nearly empty, state and the container's mechanical internal float is damaged, for example, from the remaining liquid freezing, rendering the fill level gauge inoperable.

Restaurants and bars need to ensure they are able to continue serving beverages to their customers. Bulk-fill providers need to be able to accurately identify containers that need to be refilled, avoiding unnecessary and costly premature fill runs. Therefore, restaurants, bars, and bulk-fill providers alike have a need to accurately, and in some cases remotely, determine the fill-level of their carbon dioxide containers.

Additionally, the need exists for a non-invasive means of measuring fill levels that can be retrofitted to existing containers and bulk-fill systems. Although invasive measuring devices, located within the volume of a container, are well known, the placement of an invasive measuring device within the container's inner tank is often not feasible due to any number of negative factors, including the cost of drilling into the container, the risk of possibly contaminating the liquid or gas disposed therein, the introduction of a source for a possible leak path of the liquid or gas from within the container, or structural issues that could be created by breaching the inner and outer tank's structural walls.

The need also exists for a non-invasive system that can accurately measure the fill-level of containers utilizing a tank-in-tank design. Previous non-invasive means of measuring container fill level having a single tank wall and a flexible interior bladder and have utilized impactors, solenoids, or vibration generators to vibrate the wall surface of the container, detectors to record the directly resulting response vibrations of the wall surface, and a frequency conversion means to convert the recorded data signal to frequency information and determine the peak resonant frequency response. The fill level of the single-wall container is then determined by comparing the measured peak frequency information to stored frequency and volume information for the container. Although this prior art method may have worked for single-wall containers, a measurement of the direct response of a tank-in-tank container's outer tank to vibration does not provide accurate fill level information regarding the inner tank or tank-in-tank container as a whole. Additionally, direct frequency readings of the prior art are affected by mid-range and high-range frequency ambient noise, including the common occurrence of container venting.

It is, therefore, desired that a retrofittable device and method for using the same be provided that is capable of obtaining an accurate measurement of liquid or gas volume within a tank-in-tank container in a non-invasive manner that is not affected by mid-range or high-range frequency ambient noise.

SUMMARY OF THE DISCLOSURE

In one aspect, a tank-in-tank fill level indicator, making use of noninvasive tank-in-tank measuring techniques, is provided. The housing and function of the indicator are optimized for ease of installation and automatic calibration. An electromechanical device, such as a vibration device, resonator, or exciter, vibrates the outer tank, preferably at its natural frequency of vibration, thereby inducing the vibration of the inner tank. A beating effect results from the interaction of the different resonant frequency vibrations of the two tanks. A vibration detection device, such as an accelerometer, detects the resultant beating effect of the two tanks' vibrations. A data processing device, such as a microcontroller, processes the detection data to determine the liquid volume. A display, wired or wireless data transmission device, or combination thereof, is then used to provide container fill-level information according to a reporting schedule. Container fill level information is further processed and reported, including data trending, fill delivery scheduling, fill delivery route optimization, and system troubleshooting.

Thus, the present invention provides a retrofittable device and method for using the same that is capable of accurately measuring liquid volume within a tank-in-tank container in a non-invasive manner.

BRIEF DESCRIPTION OF THE DRAWINGS

The components in the figures are not necessarily to scale or proportion, emphasis instead being placed upon illustrating the principals of exemplary embodiments of the invention. Moreover, in the figures, like reference numerals designate corresponding parts throughout the different views.

FIG. 14 is an illustrative report produced by the methods and systems of the present disclosure.

DETAILED DESCRIPTION

Figure 1:
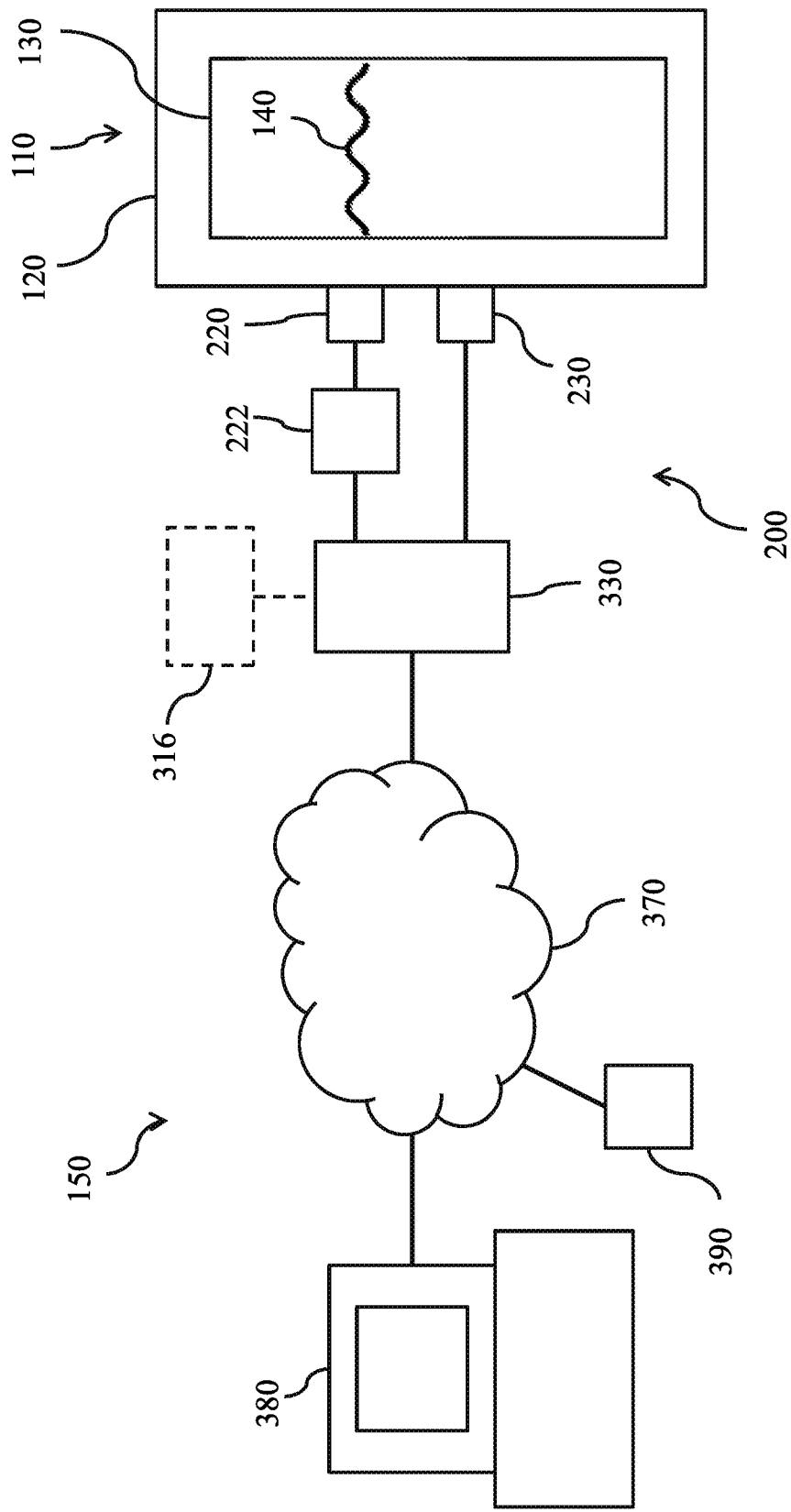
FIG. 1 is a schematic block diagram of an illustrative embodiment of a tank-in-tank fill level indicator system according to the present invention.

For the purposes of promoting and understanding the principals of the invention, reference will now be made to one or more illustrative embodiments illustrated in the drawings and specific language will be used to describe the same.

Tank-in-tank fill level indicator system 150, constructed according to the principles of this invention, is constructed for the purpose of enabling an accurate indication of liquid volume 140 within a tank-in-tank liquid container 110 in a non-invasive manner. When two or more sounds or vibrations are present having a frequency difference of less than about 20 or 30 Hz, a beat is formed at the difference frequency. The tank-in-tank fill indicator 200 associated with system 150 operates on the principle that the inner tank's resonant frequency 132 changes as the liquid volume 140 in the rigid inner tank 130 increases, and thus the number of beats present in the beat envelopes 143 per time period, resulting from the interaction of the outer tank's resonant frequency, induced by vibration applied to the rigid outer tank by an electromechanical device such as vibration device 220, and the inner tank's resonant frequency 132, induced by the outer tank's resonant frequency 122, decreases.

For example, as shown in FIG. 1, an illustrative tank-in-tank fill level indicator 200 according to this invention generally include (1) a vibration device 220, such as an exciter or resonator, driven by an amplifier 222 to vibrate the outer tank 120, thereby inducing the vibration of the inner tank 130 and creating a beating effect signal 142 as a result of the interaction of the vibrations of the two tanks 122 and 132; (2) a vibration detection device 230, such as an accelerometer, to detect and transmit a data signal indicative of the resultant beating effect signal 142 of the wave interference of the inner and outer tanks' resonant vibrations 122 and 132; (3) an analog envelope tracker circuit 232 to take the high frequency resultant beating effect signal 142 as input and provides a low-frequency output signal which is the beat envelope 143 or beats of the original signal; (4) a data processing device 330, such as a microcontroller, to receive the data signal from the vibration detection device 230, record the number of resultant beats in the beat envelopes 143 within a given timeframe, and use the number of resultant beats to determine a corresponding fill level 140 contained within the inner tank 130 that corresponds to that number of beats; (4) a display 316; and a wireless transceiver 350, to transmit container fill-level information. An illustrative container fill level monitoring system 150 includes a fill level indicator 200 and a geographically remote server 380 in communication via a wide area network 370 to determine when the container 110 needs to be refilled and to provide various other methods and processes described herein.

The tank-in-tank fill level indicator 200 of this invention can be used either to supplement the built-in indicator gauge (not shown) of the container 110, or in the case of a broken indicator gauge, to function as the primary fill-level indicator. The fill-level indicator 200 can include a visual display 316 such as light emitting diodes or a display screen to provide a visual indication of the measured fill level. Alternatively or additionally, the output of the fill level indicator can be transmitted via a wide area network (WAN) 370, including, for example, a wired local area network, WiFi, 900 MHz SCADA and/or cellular broadband. Transmitted data can then be processed by the geographically remote server 380, including, for example, to determine the appropriate time to refill the container.

In an illustrative embodiment, the utilization of a cell-based data connection exceeds the coverage capability of 900 MHz communication systems and eliminates the need to integrate with a WiFi network or other LAN and any associated issues, e.g. firewalls, changing passwords, or different SSIDs. Data trending and analysis is performed by remote server 380, e.g. a cloud based server. The data and associated analysis and other services can be accessed and viewed via a web browser via any user computing device 390, eliminating any need for a specialized computing device. The remote server 380 can also interface with Enterprise Resource Planning (ERP) systems so that information is sent directly to users' computing device 390, for example, handheld devices in the field. In the event that multiple storage containers 110 in the same area are monitored, an illustrative embodiment utilizes 900 MHz wireless transceivers 350 for each of the individual indicators 200 to communicate with a single shared broadband wireless transceiver for connectivity with WAN370.

Figure 2A:
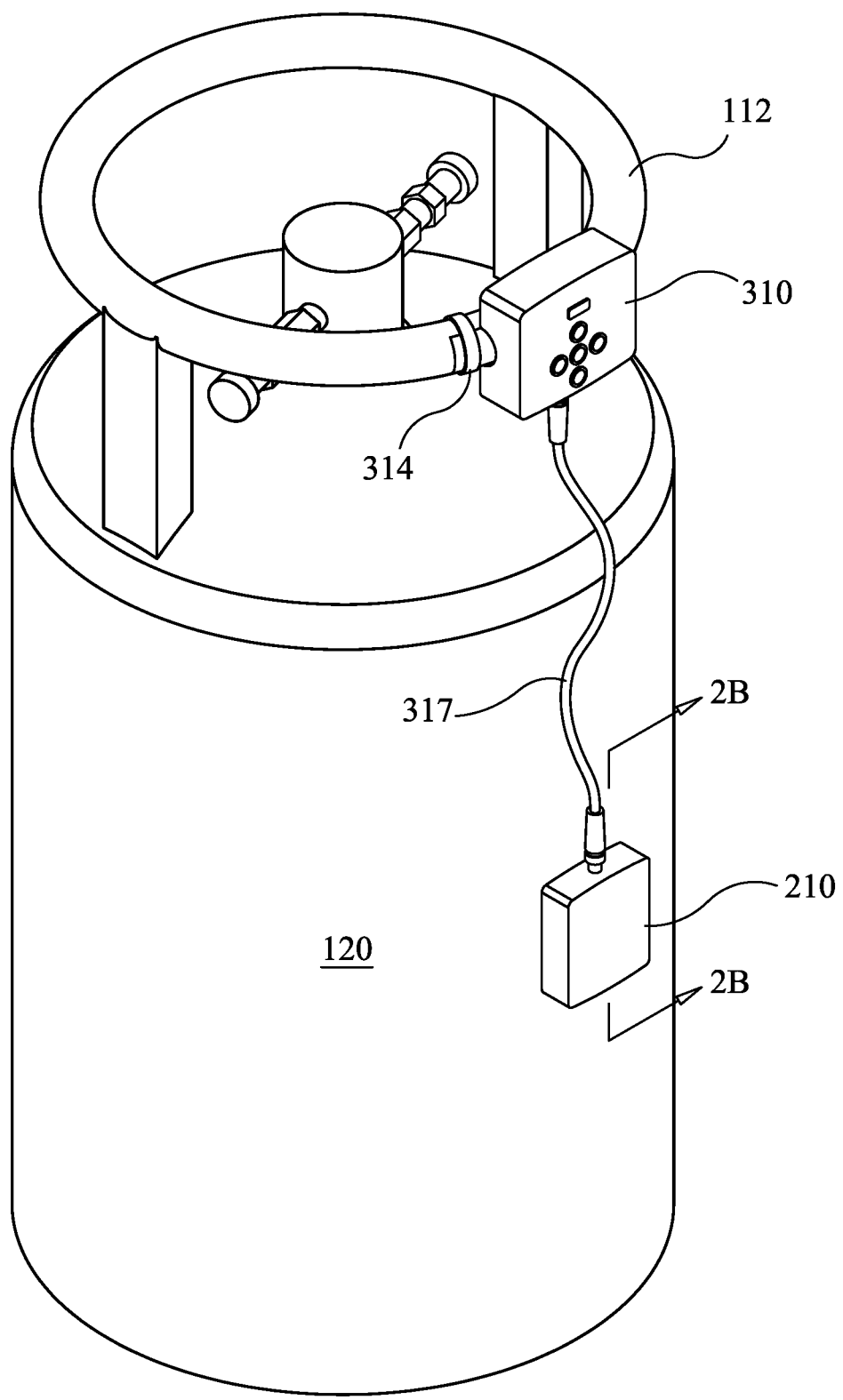
FIG. 2A is an illustrative tank-in-tank container, with a vibration device and detection device coupled to the outer surface of the outer tank.
Figure 2B:
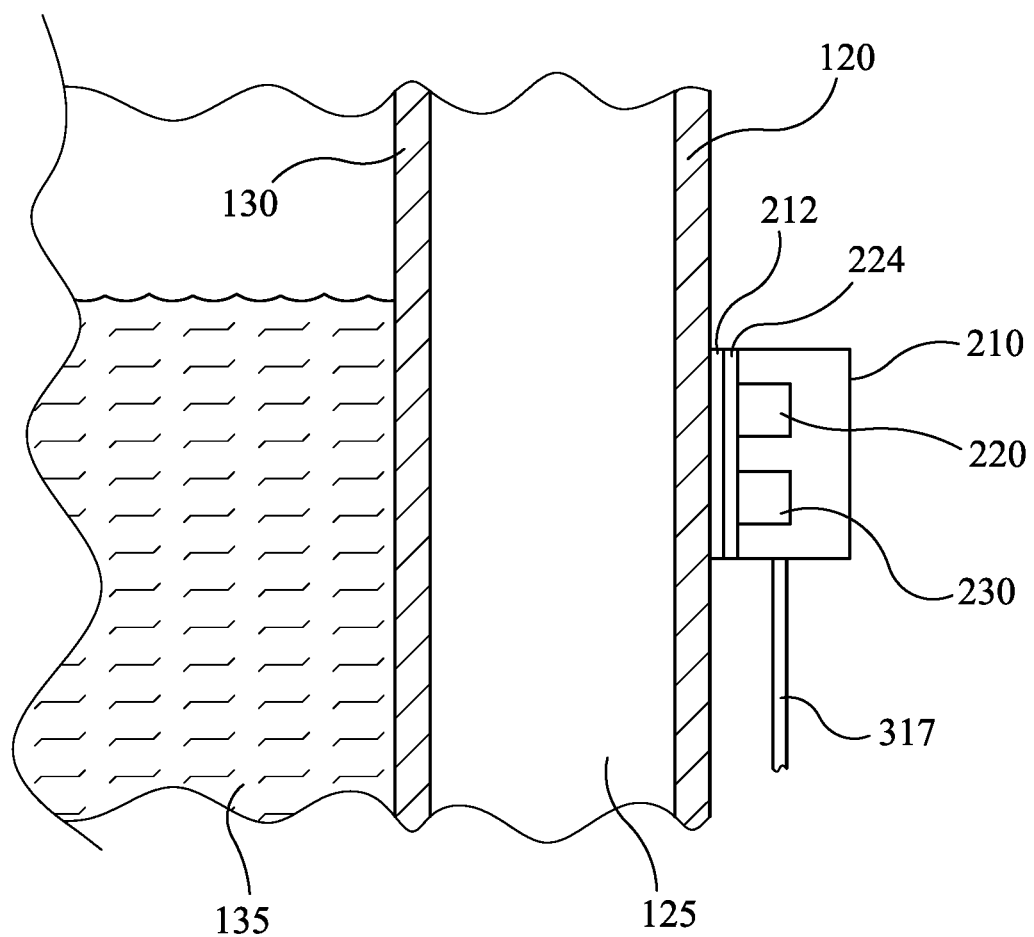
FIG. 2B is a cross sectional view of an illustrative tank-in-tank fill level indicator secondary unit, with the secondary unit coupled to the outer surface of the outer tank.

An illustrative embodiment is shown in FIG. 2, where a vibration device 220, such as a compact audio exciter, part number HIHX14CO2-8, available from Tectonic Elements of Cambridge, U.K., is used to vibrate the outer tank 120 of a carbon dioxide container 110 and an accelerometer 230 is used to detect and transmit a data signal indicative of the resultant beating effect signal 142 (FIG. 3) of the wave interference of the inner and outer tanks' resonant vibrations 122 and 132. In an alternative embodiment, the vibration device 220 and the vibration detecting device 230 may be a single dual function device.

Figure 3:
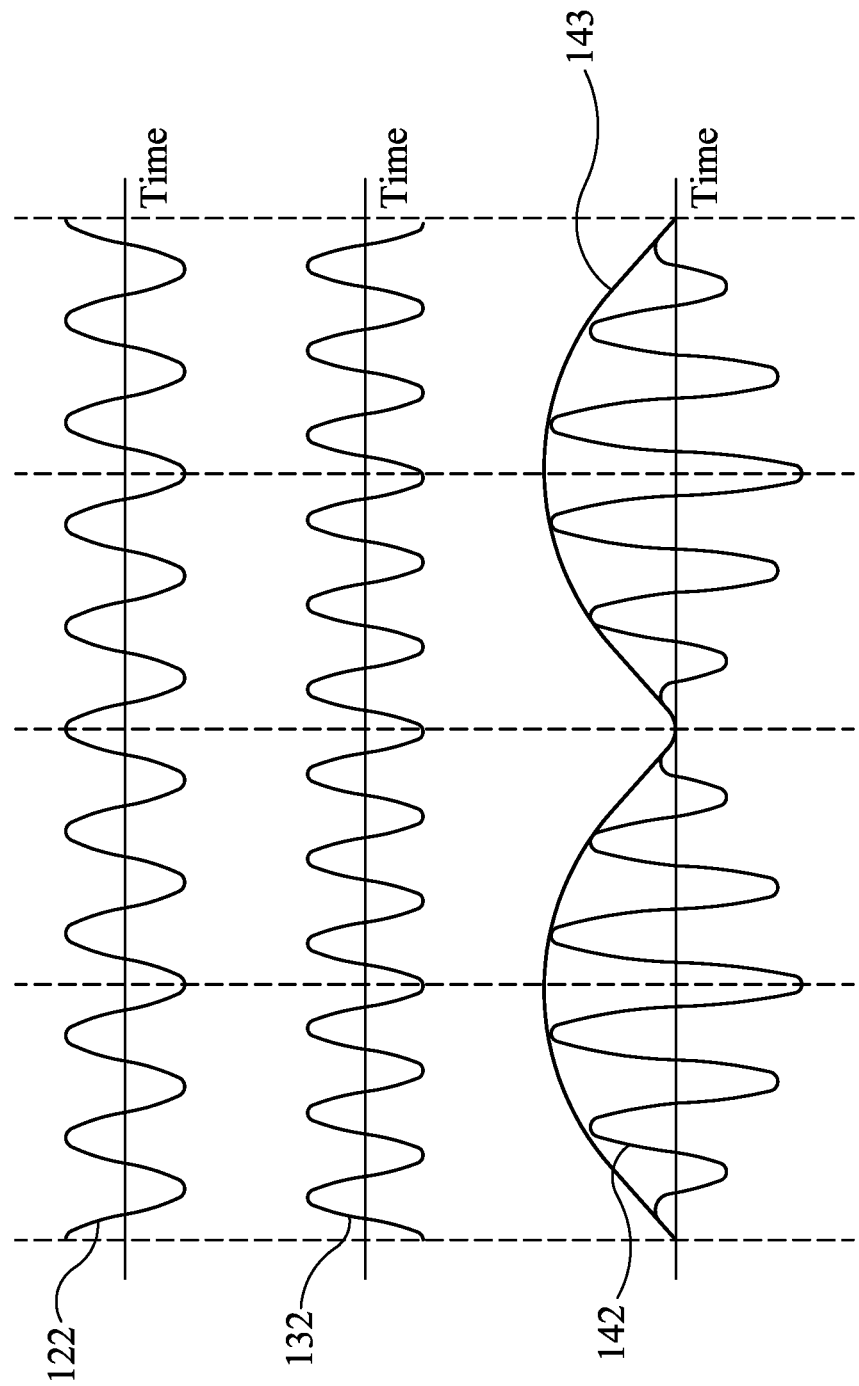
FIG. 3 is an illustration showing the resonant response of an inner and outer tank and a resulting beating effect signal of the two responses.

As an illustration of the formation of a resultant beating effect at a beat frequency, FIG. 3 shows a first frequency 122 representative of the outer tank 120 resonant frequency response to exciter 220, a second frequency 132 representative of the inner tank 130 variable resonant frequency induced by the first frequency 122 and varied based on fill-level, and the resulting beating effect signal 142 of the two different frequencies. FIG. 3 also shows how the two frequencies 122 and 132 interact with each other constructively or destructively, based on a summation of the two signals 122 and 132, thereby forming a resultant beating effect signal 142. The beating effect signal 142 oscillates with the average frequency of the two vibration frequencies 122 and 132, and its amplitude envelope 143 varies according to the difference between the two frequencies 122 and 132. The amplitude envelope 143 causes the perception of "beats."

Figure 4:
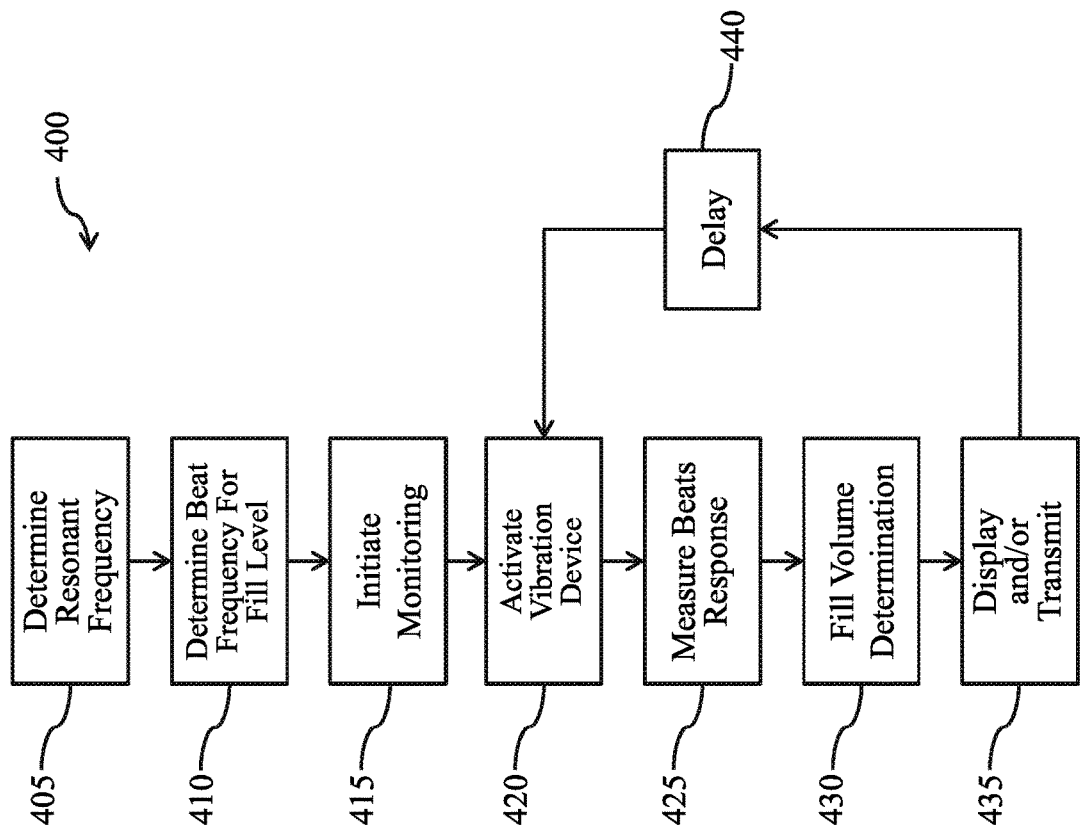
FIG. 4 is a process diagram of an illustrative embodiment of the system according to the present invention.

FIG. 4 illustrates a process 400 for measuring a liquid level 140 within a tank-in-tank container 110 including, for example, the steps of determining the constant resonant frequency of the outer tank 405, determining the resulting beat frequency for different fill levels of the container 410, initiating monitoring of the container's fill level 415, activating the vibration device 420, measuring the beats response 425, determining fill volume 430, displaying or transmitting the determined fill level 435, and some delay of time 440 prior to activating the vibration device 220 again. Control and execution of one or more of the steps of process 400 can be implemented by the data processing device 330, for example, implemented by software associated with data processing device 330. Alternatively, the processing of the data signal from the low frequency vibration detecting device 230, including determination of the volume of liquid 140 contained within the inner tank 130 can be performed in part or fully by the geographically remote server 380. Fill volume can be determined in step 430 through the use of a stored lookup table or by using an equation.

Unlike a loudspeaker that uses a frame and a cone diaphragm to couple vibrations to the surrounding air, the vibration device 220 uses the movement of the device itself to apply force from an exciter voice coil to the mounting surface, which is usually flexible enough to vibrate. In an illustrative embodiment, the vibration device 220 includes a coupling plate 224 that is directly coupled to the outer tank 120, and transmits vibrations from the vibration device 220 to the surface of the outer tank 120; therefore, the coil or vibrating element does not necessarily directly contact and strike the surface of the outer tank 120. Alternatively, a frame, housing, or coupling plate of the vibration device 220 can be mechanically coupled to the tank 110 using a material with preferably high compressive strength and moderate to high bending strength.

Although vibration of the outer tank 120 can be induced at any number of frequencies, it is preferable to vibrate the outer tank 120 at its natural or resonant frequency 122 to increase the efficiency of the vibration device 220. The resonant frequency 122 of the outer tank 120 can be predetermined by tapping the outer tank 120 and analyzing the resulting sound waves induced by resonant vibration using a sound frequency analyzer to identify the outer tank's resonant frequency 122. Alternatively, the outer tank 120 can be vibrated across a range of frequencies that includes the outer tank's resonant frequency 122 and the resonant frequency can be determined by analyzing the response. In an illustrative embodiment, the natural frequency of the outer tank 120 of a 750 pound bulk carbon dioxide container 110 is approximately 200 Hertz. The natural frequency 122 of the outer tank 120 remains constant and is independent of the fill-level 140 of the inner tank 130.

Similarly, vibration can be induced in the outer tank 120 at any number of physical locations of the outer tank 120 surface and it is preferable to identify and vibrate the outer tank 120 in a particularly responsive physical location of the outer tank 120 surface to increase the efficiency of the vibration device 220. A responsive physical location can be predetermined by tapping the outer tank 120 and analyzing the resulting sound or vibration waves using a sound frequency analyzer to identify the most responsive physical location. In an illustrative embodiment, the most responsive location of a 750 pound carbon dioxide container 110 was determined to be about 10 inches below the tank's upper horizontal seam.

The natural frequency of the outer tank 120, most responsive physical location of the outer tank 120, and beat characteristics can vary with different forms of tank-in-tank construction, including tank materials, size, and shape, as well as with different contained liquids. Within common application, there are a reasonably limited number of particular container manufacturers and variations, with a relatively small number of container designs covering a majority of the market; therefore, the characteristics of a particular tank and contained liquid, including corresponding beat and fill-level data typically can be predetermined.

A brief resonant frequency pulse is applied to the outer tank 120 by a vibration device 220, causing a vibration in the outer tank 122 and inducing a vibration of the inner tank 130. The vibratory forces of the inner 130 and outer 120 tanks transfer to one another, resulting in a beating effect signal 142 as the waveforms alternately reinforce one another at some times and cancel one another at other times. During times when the vibration from each source adds constructively, the amplitude of the vibration increases; during times when the vibration adds destructively, the amplitude of the vibration decreases. Because the natural or resonant frequency 122 of the outer tank 120 remains constant and the natural or resonant frequency 132 of the inner tank 130 changes with fill level 140, the number of beats or number of beat envelopes 143 occurring in the beating effect signal 142 in a given timeframe also changes based on fill level 140. In an illustrative embodiment, a class-D amplifier or switching amplifier 222 is used to control the voltage applied to an exciter 220. A class D amplifier is an electronic amplifier in which the amplifying devices operate as electronic switches instead of as linear gain devices as in other amplifiers, thereby providing a high level of efficiency and very little power loss to heat.

Because the beat frequency of amplitude envelope 143 is a very low frequency, the need for traditional frequency conversion methods, such as Fourier transforms, is eliminated. The vibration detection device 230 simply detects the resultant beating effect signal 142 and a data processing device 330 counts the number of beats in a given timeframe. In an illustrative embodiment, a simple microcontroller 330 is used to count the number of beats occurring in a 1-second time period. Data processing device 330 can be any control device, including a processor, discrete logic and/or analog devices, or an ASIC, implemented with or without software.

Additionally, ambient noise typically found in real-world conditions, including venting that reduces pressure caused by some of the liquid carbon dioxide warming and changing state to a gas, is of a much higher frequency and does not affect the measurement of the resultant beating effect signal 142. If desired, a bandpass filter such as an envelope tracking filter can be used to eliminate higher frequencies. In an illustrative embodiment, a low-frequency accelerometer 230 is used to detect the beating effect signal 142 and an analog envelope tracking circuit 232 eliminates the higher frequency component to provide the resulting low frequency beat envelope 143. An envelope tracking circuit 232 takes the high frequency resultant beating effect signal 142 as an input and provides an output which is the amplitude envelope 143 of the original signal 142. Examples of suitable envelope detectors include diode detectors, mixers, squaring cells, absolute value circuits, logarithmic amplifiers, etc, as are known in the art. An illustrative envelope tracking circuit 232 uses low power, single-supply, rail-to-rail operational amplifiers for envelope detection and processing. Typical measurements of the beat frequency in the beating effect signal 142 in an illustrative embodiment range from approximately 1 hertz to 10 hertz. For example, for an illustrative embodiment, a fill level of 25% resulted in approximately 5 beats per second (5 Hz) and a full container resulted in approximately 1 beat per second (1 Hz).

The fill-level indicator can be battery or 120V ac powered. The frequency of fill-level checks is chosen depending upon the power source used. As few as one check a day can be made to conserve power or multiple checks can be made each day if power consumption is not a concern. Likewise, the fill level indicator can be placed in an inactive battery conserving state, when not actively taking measurements or transmitting data, to conserve battery power. The amount of delay between measurements can be determined based on factors such as power consumption and predicted rate of fluid level change.

Figure 5:
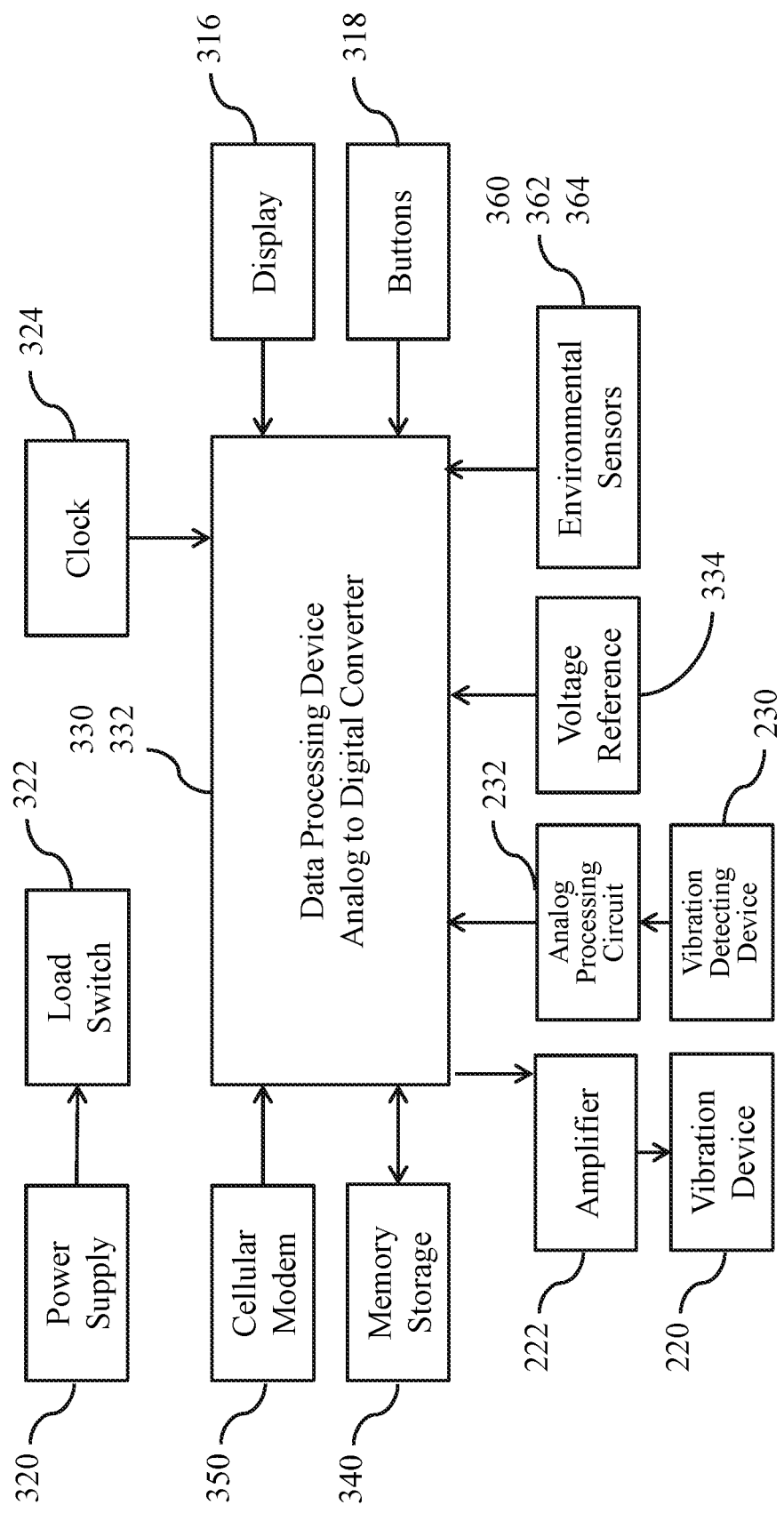
FIG. 5 is a block diagram of an illustrative embodiment of an illustrative tank-in-tank fill level indicator according to the present invention.

In an illustrative embodiment represented by a schematic diagram in FIG. 5, a load switch 322, such as a PFET Load Switch, part number TPS34082L, available from Texas Instruments of Dallas Tex., is used to switch the voltage from the power supply 320. Although any standard power supply 320 can be implemented, batteries are used as a power supply 320 in an illustrative embodiment, thereby eliminating the need for any additional power supply wiring. For example, lithium thionyl chloride batteries are advantageous based on a number of factors, including a wide range of temperature operation and a low self-discharge rate. However, lithium ion rechargeable batteries are also an attractive power supply 320 option, particularly given recent advances in lithium ion technology and decreasing self-discharge rates. Lithium ion rechargeable batteries are also particularly well suited to application in the present invention due to their low impedance, ability to store large amounts of energy, and recharging capabilities.

A sound exciter, for example, a compact audio exciter such as part number HiHX14CO2-8 available from Hiwave Technologies, which was acquired by Tectonic Elements of Cambridge, U.K., is used as a vibration device 220 in an illustrative embodiment. By vibrating a solid object, an audio exciter essentially turns the solid object into a speaker. A typical Class-D mono audio amplifier 222, such as part number PAM8302A available from a Diodes Inc. of Plano, Tex., is used to turn the vibration device 220 on and off such that the output is pulse width modulated, providing for increased efficiency and accuracy in relation to alternative linear amps. An illustrative microcontroller 330 is part number ATXMEGA256A3U available from Atmel Corp of San Jose, Calif. is used as an because it is simple, inexpensive, and capable of a low-current draw deep sleep state. A low power clock 324, such as part number PCF8563 available from NXP Semiconductors N.V. of Eindhoven, Netherlands, is used to wake up the data processing device 330 at a specified interval. An analog accelerometer 230, such as a 3-axis solid-state accelerometer part number ADXL335 available from Analog Devices of Norwood, Mass., detects vibrations. Alternatively, another sensor type used for vibration measurements can be used to detect vibrations, e.g. velocity sensor, proximity probes, or laser displacement sensors. The z-axis is monitored in an illustrative embodiment since only one direction of vibration detection is of interest. An envelope tracker analog processing circuit 232, as known to one of ordinary skill in the art, tracks the envelope of the output of the accelerometer and strips off any high-frequency component providing simplified measurement of the resulting beat envelope 143.

An analog to digital converter 332, a function performed by the data processing device 330 in an illustrative embodiment, is used to process results from the analog accelerometer 230, in an illustrative embodiment. The data processing device 330 can utilize a high precision voltage reference 334, such as part number REF3030 available from Texas Instruments of Dallas, Tex., to detect extraordinarily small vibrations. In an illustrative embodiment, the voltage reference outputs a precise 3 volts. The digital to analog converter 332 is used to generate a sine wave, such that in an illustrative embodiment, the sine wave is centered at 1.5 volts, modulating between 0 volts and 3 volts.

In an illustrative embodiment, the wireless transceiver 350, such as a part number XB24C RF module available from Digi International Inc., can be turned on or off, as well as reset. The wireless transceiver 350 can be a cellular modem. Additionally, the wireless transceiver 350 can communicate with the server 380 via standard machine to machine protocol. In an illustrative embodiment, a MICROSD™ (trademark of SD-3C LLC of North Hollywood, Calif.) card is used for memory storage 340. Because the illustrative data processing device 330 is inexpensive and includes minimal on-board storage, information received by the wireless transceiver 350 may be stored in memory storage 340 and then loaded to the data processing device 330. Additionally, fill level and other measurements can be stored in memory storage 340 to be transmitted at a later time. For example, battery 132 life can be conserved by taking multiple reading between transmissions and only utilizing the wireless transceiver 350 at specified intervals. Also, in the event that cellular or other communications fail, measurements can be stored and transmitted once wireless communication is restored.

Environmental factors affect the beat frequency and thus, in an illustrative embodiment, the corresponding fill volume value for a given beat frequency is determined in light of environmental factors, including ambient temperature, humidity, and barometric pressure. An illustrative fill level indicator also includes environmental sensors, including digital temperature 360, humidity 362, and barometric pressure sensors 364. An illustrative embodiment utilizes a miniature inter-integrated circuit ($I^2C$) digital barometer 364 such as part number MPL140A2, available from Freescale Semiconductor of Austin, Tex., and a Si7021-A20 $I^2C$ humidity sensor 362 and temperature sensor 360, available from Silicon Labs of Austin, Tex.

A display screen 316, such as an organic electroluminescence (OEL) display module, for example, part number UG-2864HSWEG01 available from Univision Technology Inc. of Chunan, Taiwan, provides a visual output interface. One or more buttons 318, such as pushbutton power switches, part numbers PV5S64012 and PV5S64017 available from Digi-Key of Thief River Falls, Minn., provide an input interface. Alternative user interfaces known in the art can be used additionally or alternatively.

In an illustrative embodiment, battery life is preserved by utilizing low-power usage components and component sleep states to minimize circuit current and circuit current draw in a sleep state. The battery of an illustrative embodiment is intended to last multiple years, thereby minimizing the need for gas supply drivers to change or replace batteries. In an illustrative embodiment, the wireless transmission device consumes the most power and thus the transmission of wireless reports is performed as infrequently as possible, dependent upon the rate of level change in the tank. In an illustrative embodiment, only the data processing device 330, including the analog to digital converter 332, the clock 324, and the buttons 318 have a direct connection to the power supply 320, i.e. are powered all of the time. The remaining components are disconnected from the power supply 320 when not in use by the load switch 322 in order to preserve battery power.

In regards to hardware implementation and circuitry associated with an illustrative embodiment, it is important to note that the same functionality can be accomplished at least in part with software, as will be apparent to one of ordinary skill in the art. In other words, a more expensive processor can accomplish features that would otherwise be implemented with additional circuitry. Additionally or alternatively, in regards to software implementation and the processor and other hardware associated with an illustrative embodiment, it is noteworthy that the same functionality can be accomplished at least in part with hardware, as will be apparent to one of ordinary skill in the art, though at a potential cost or other advantage or disadvantage.

As shown in FIGS. 6A, 6B, 7A and 7B, an illustrative embodiment of the fill indicator 200 separates the main housing 310 of the data processing device 330 from the sensor head housing 210 to minimize any damping effect on the low frequency detecting device 230; i.e. the main unit 310, including the power supply 320, is heavy enough to dampen the vibratory signal of the vibration device 220 and the resultant beating effect signal 142 detected by the low-frequency vibration detecting device 230 if the vibration device 220 and low-frequency vibration detecting device 230 are incorporated into the main housing 210. Additionally, the housing of the main unit 310 of an illustrative embodiment is adapted to fit on the handle 112 of a commercial container 110 such that a recessed portion 312 in the back of the main housing 310 mates to the handle 112 of the tank 110. This allows the main housing 310 to be easily attached to the handle 112 of the tank 110 by utilizing simple attachment bands or clamps 314.

In an illustrative embodiment, the sensor head housing 210 is separate from the main housing 310, including only the vibration device 220 and vibration detecting device 230. This keeps the mass of the sensor head 210 low, such that the excitations from the vibration device 220 inducing resonant frequency 122 and 132 and beating effect signal 142 detected by the vibration detecting device 230 are not damped or affected by the mass and weight of the main unit 310. The sensor head 210 of an illustrative embodiment is outdoor rated and is attached to the surface of outer tank 120 of the container 110 by utilizing double-sided tape or some other adhesive 212.

Because tanks are often located outside or subjected to adverse conditions, the housings 210/310 of an illustrative embodiment are outdoor-rated such that they are capable of withstanding snow, rain, and wind. This entails the gasketing of all device openings, seams, and connections. Specifically, an illustrative embodiment is dustproof and waterproof; i.e. can withstand the effect of immersion in water between 15 centimeters and 1 meter, but cannot withstand long periods of immersion under pressure, for example, IP67 rating.

Figure 6A:
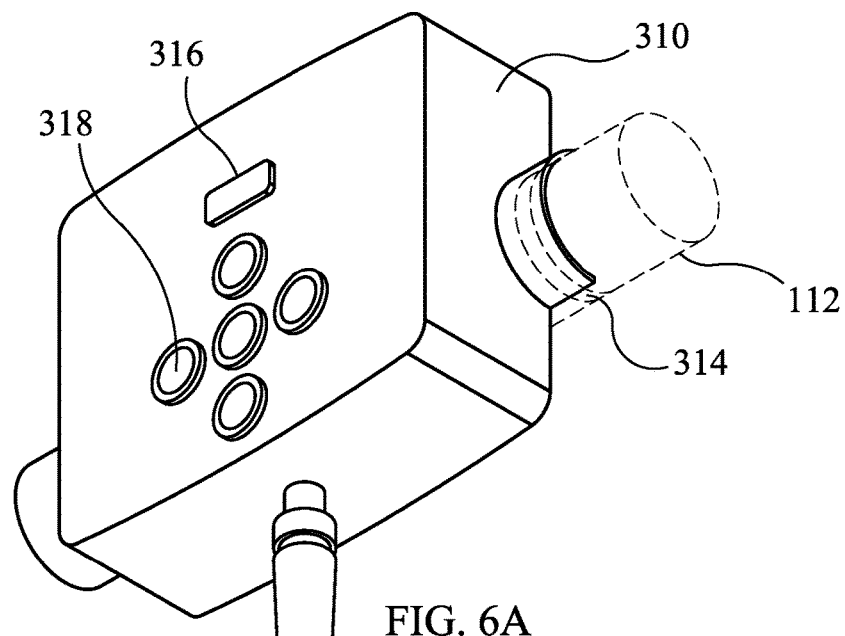
FIGS. 6A and 6B are a front view and a rear view, respectively, of an illustrative tank-in-tank fill level indicator main unit according to the present invention.
Figure 6B:
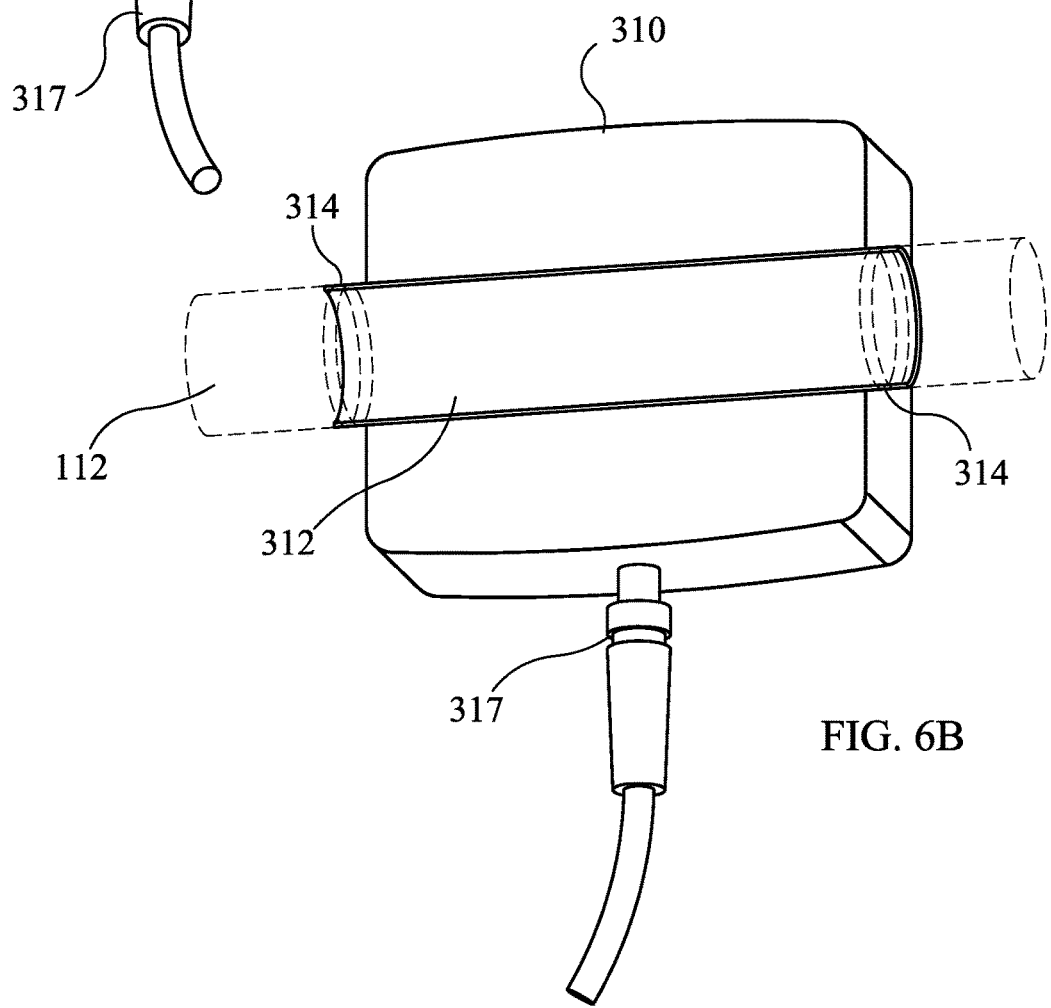
Figure 7A:
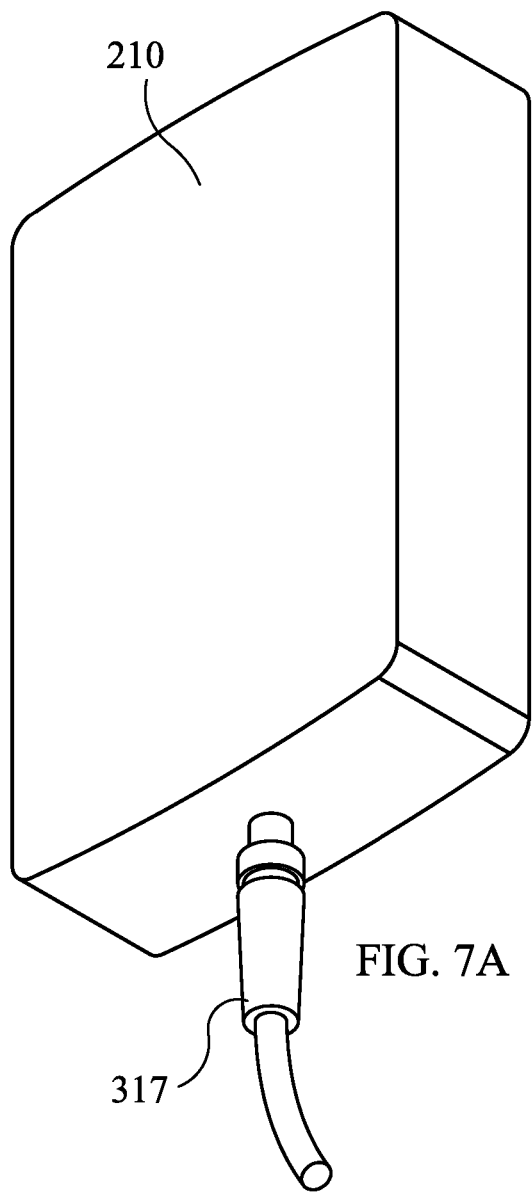
FIGS. 7A and 7B are a front view and a rear view, respectively, of an illustrative tank-in-tank fill level indicator secondary unit according to the present invention.
Figure 7B:
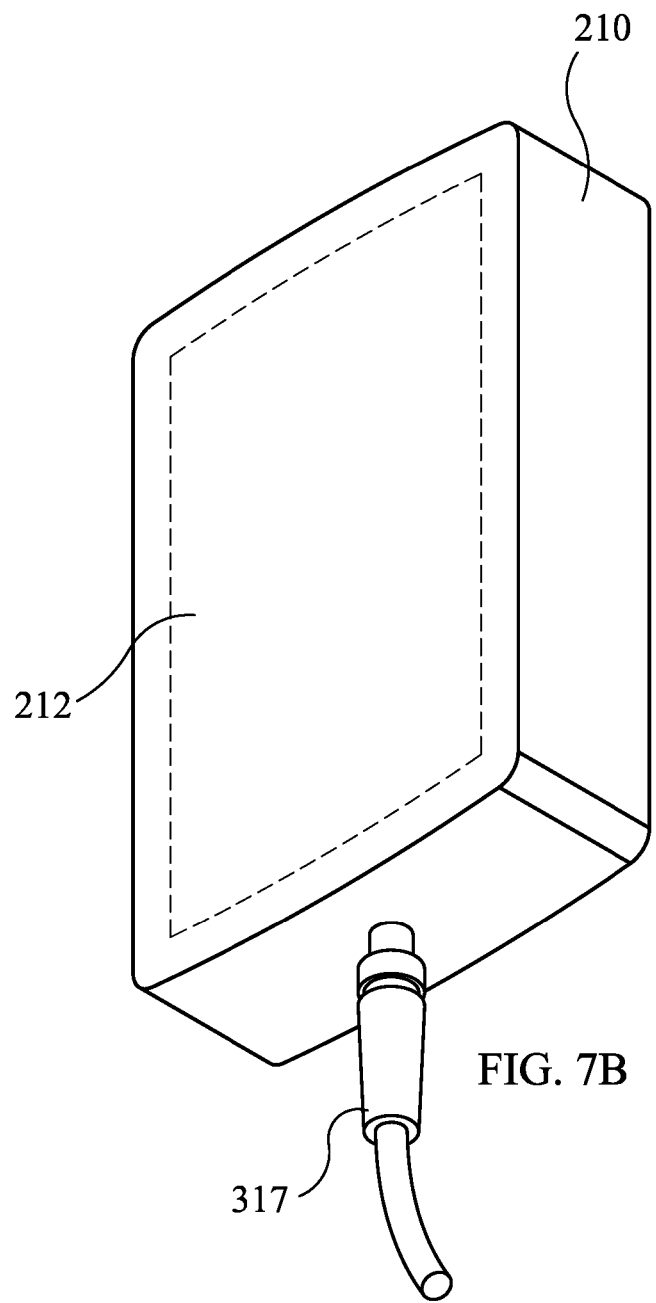
Figure 8:
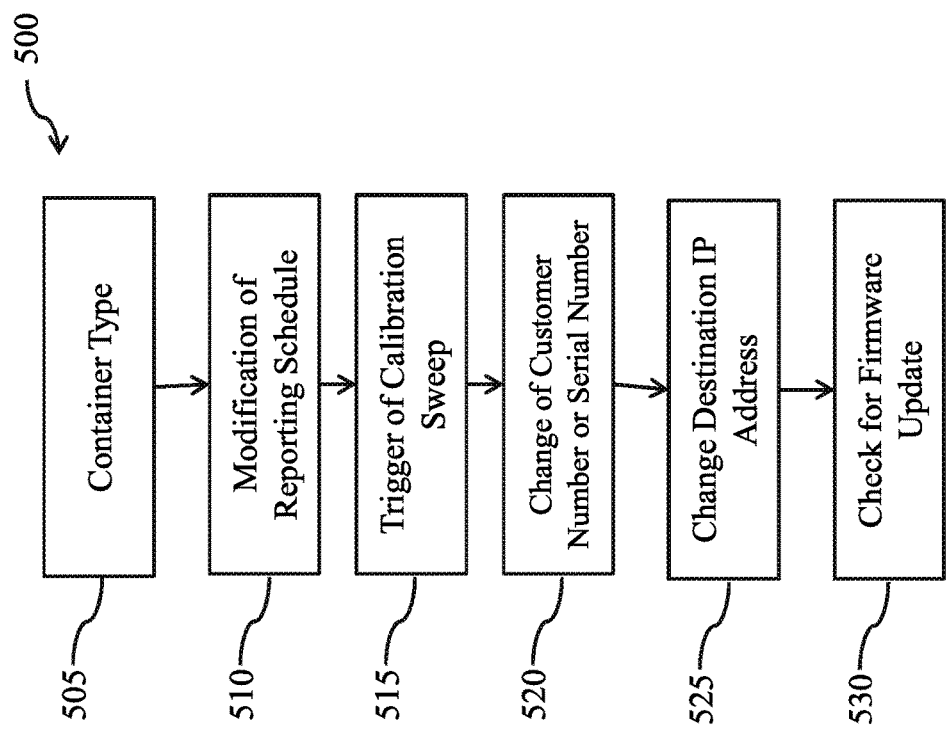
FIG. 8 is a process diagram of an illustrative embodiment of the main unit menu according to the present invention.
Figure 9:
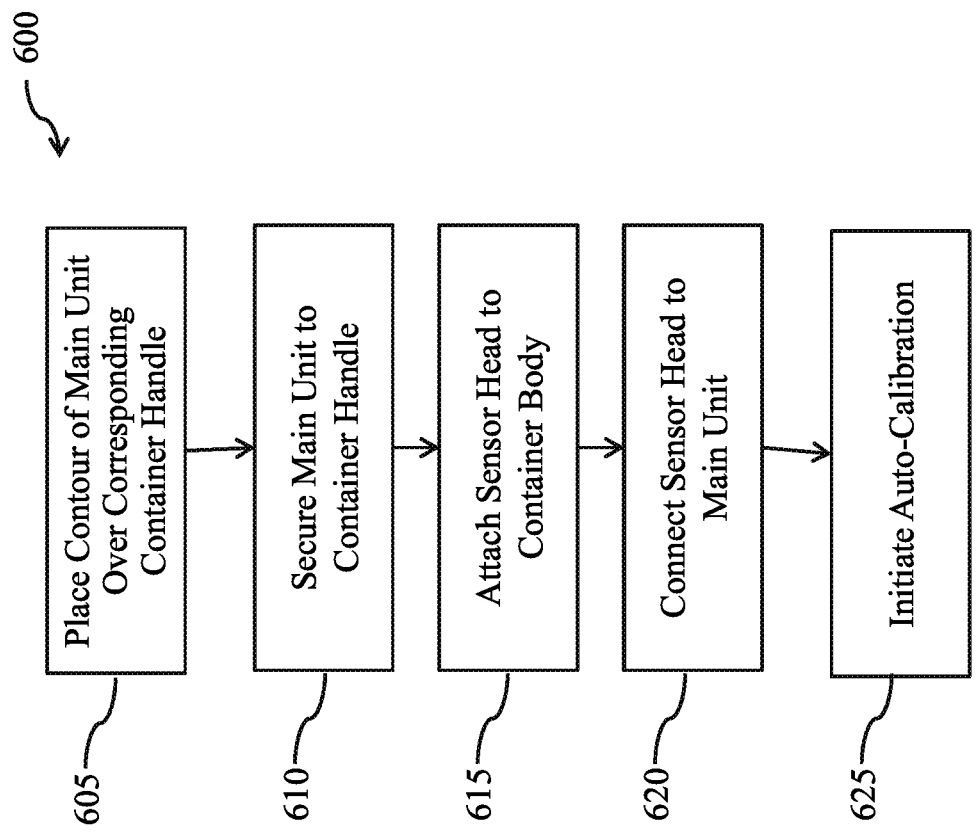
FIG. 9 is a process diagram of an illustrative embodiment of the installation method according to the present invention.

Referring to FIG. 6A, an illustrative embodiment consists of buttons 318 arranged in a cross shape, such that there are center, top, bottom, left, and right buttons. However, any number of other interface components could be utilized, including touchscreens, wireless connections, or remote displays. In an illustrative embodiment, pressing the center button initiates display of a tank-level indication on the display 316. If no additional buttons are pressed, the display times out and turns off after a preset number of seconds, for example, 3 seconds. However, pressing the center button a second time before the display times out initiates display prompting the user for a password. The user then inputs a number of alphanumeric characters, for example four characters, as a password to gain access to a device menu process 500, as shown in FIG. 8. In an illustrative embodiment the menu 500 enabled by software and hardware associated with the fill level indicator 200, including data processing device 330. Additionally or alternatively, menu 500 may be enabled by remote monitoring system 380. The menu 500 includes settings for container type 505, modification of reporting schedule 510, trigger of calibration sweep 515, change of customer number or serial number 520, change destination IP address 525, and check for firmware update 530. The selectable items of menu 500 may be displayed or selected in any order and the significance of and processes for some of the selectable items of menu 500 are discussed further below.

An illustrative installation method 600 of the fill level indicator 200 of the present invention provides a significant benefit over the prior art. A known alternative method of identifying tank level required placing scales under the container 110 and communicating with the scales to determine volume based on weight. However, scales that can accurately measure the weight of a full container 110 are cost prohibitive and difficult to install because the container must be lifted onto the scale. In an illustrative embodiment shown in FIGS. 6A and 6B, the main unit mounting contour 312 matches the container handle 112 and the main unit housing 310 can be placed 605 over the handle 112. In securing step 610, attachment bands 314, for example, adjustable clamps, ties, or a tape, or other circumferential securing devices can then be tightened over the contour 312 and handle 112 of opposing sides of the main unit housing 310, securing the main unit housing 310 to the handle 112. The sensor head unit housing 210 is then attached in step 615 to the outer tank body 120 using pre-installed double sided tape or similar adhesive 212. This allows the fill level indicator 200 to be installed quickly and efficiently by supplier drivers or other users. The sensor head housing 210 can then be coupled 620 to the main unit 310 via a wired connection 317 or, alternatively, may wirelessly communicate with the main unit. Once the unit is installed on the container 110, the driver initiates an auto-calibration process step 710 at step 625.

Figure 10:
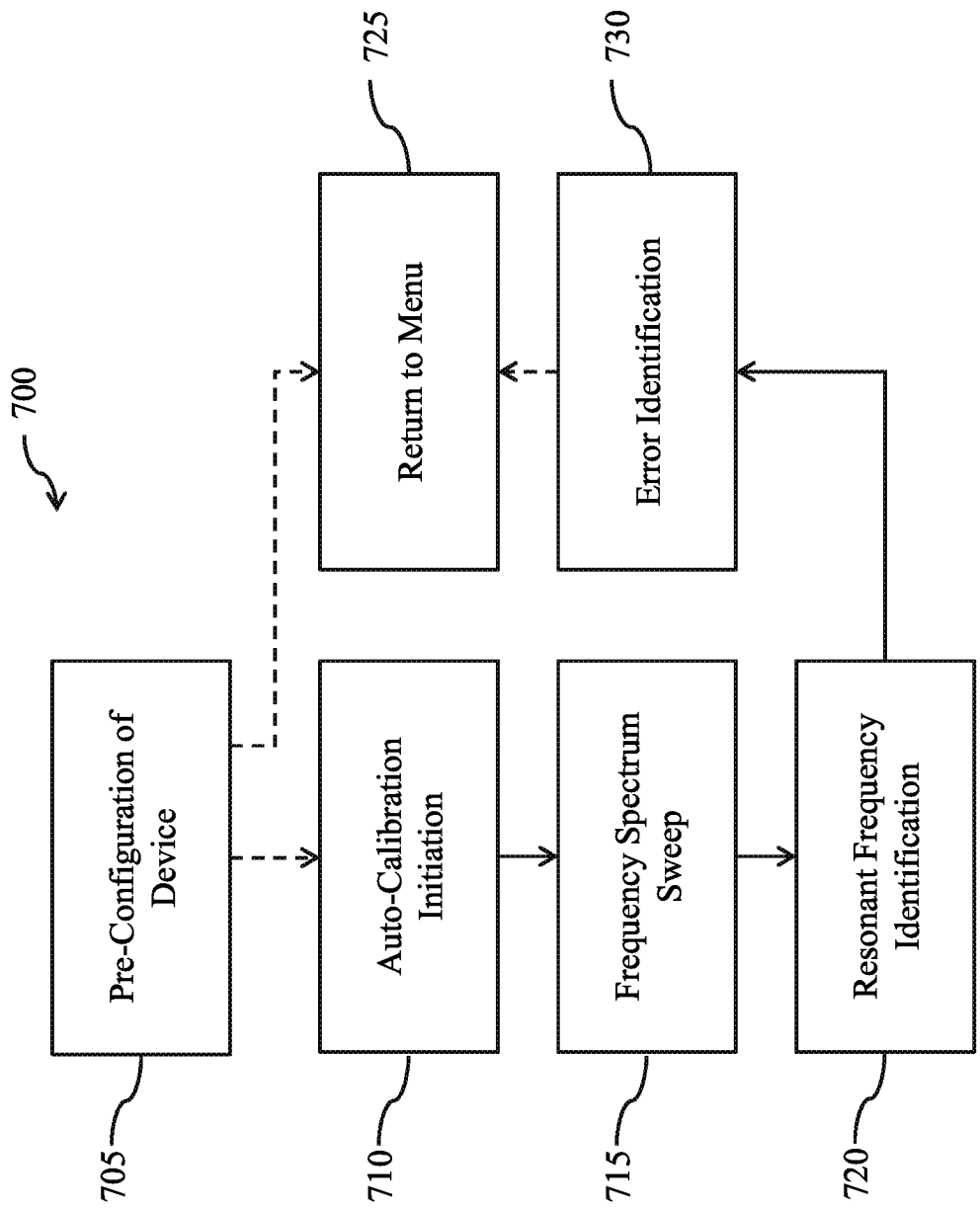
FIG. 10 is a process diagram of an illustrative embodiment of the auto-calibration method according to the present invention.

As shown in FIG. 10, an illustrative auto-calibration process 700 is enabled by software and hardware associated with the fill level indicator 200, including data processing device 330. Additionally or alternatively, process 700 may be enabled by remote monitoring system 380. According to the present invention, auto-calibration process 700 includes pre-configuration of device in step 705, auto calibration initiation 710, frequency spectrum sweep 715, resonant frequency identification 720, error identification 730, and return to menu 725. Typically a device would be pre-configured 705 to facilitate a quick installation process 600 in the field. If the device has not been pre-configured, the installer will be prompted, or otherwise have the option, to select the tank type from the menu at step 725. Given that a particular tank's resonant frequency 122/132 can vary by a few Hz, the vibration device 220 pings the outer tank 120 at a preconfigured range of frequencies to identify the outer tank's particular resonant frequency 122. The frequency range of the vibration device's frequency sweep is determined in step 715 based on the tank type, including size, shape, or model of the container 110, e.g. a typical sweep may range from 10% below the tank type's usual resonant frequency to 10% above the tank type's usual resonant frequency. As an example, if a particular container type's resonant frequency for the outer tank 120 is typically 200 Hertz, the transducer's spectrum sweep may range from 180 to 200 hertz.

Once identified, the resonant frequency 122 is stored and future excitation of the tank is performed at the particular tank's resonant frequency. If the resonant frequency identification step 720 fails, i.e. the system cannot identify the resonant frequency within the spectrum range of the frequency sweep, the installer is notified via an error message 730 and prompted to select the tank type from the menu at step 725 before the frequency sweep 715 is performed again. Other possible errors that can result in error message 730 include contact between the tank and one or more other objects, thus dampening the vibration signal applied to the outer tank 122 and/or the resultant beating effect signal 142.

Figure 11:
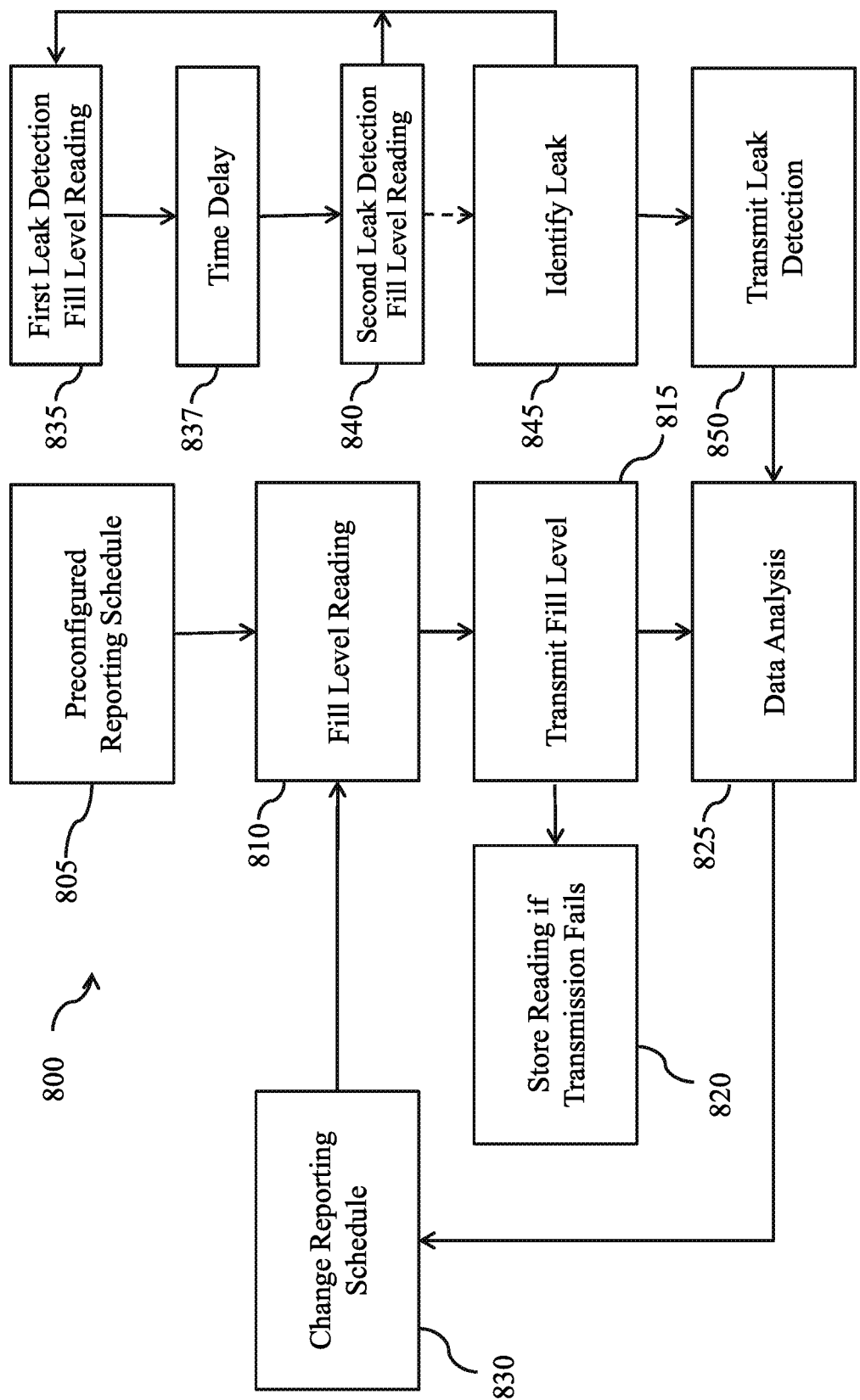
FIG. 11 is a process diagram of an illustrative embodiment of the data reporting method according to the present invention.

As shown in FIG. 11, the steps of an illustrative data reporting and trending process 800 are enabled by software and hardware associated with the fill level indicator system 150, including data processing device 330 of indicator 200 and additionally or alternatively, remote monitoring system 380. The illustrative data reporting and trending process 800 include preconfigured reporting schedule 805, fill level reading 810, transmit fill level 815, store reading if transmission fails 820, data analysis 825, and change reporting schedule 830. In regards to the preconfigured reporting schedule 805, once a day is typical for taking a fill level reading 810 and transmitting the fill level 815, but the rate of reporting can be increased or decreased based on usage. In other words, the reporting schedule can be changed based on usage to preserve battery life, e.g. if the usage rate decreases, the frequency of reporting can also decrease. Reporting 815 may also include other recorded measurement and time stamps, such as data recorded during a leak check 840/845. Additionally, the remote monitoring system 380 of an illustrative embodiment can push a new configuration down to the indicator 200 with a changed reporting schedule 830.

Leak detection analysis can also be performed by the indicator 200 or by the remote monitoring system 380 level. Container systems often include multiple opportunities for leaks, such as hoses and junctions. Given that gases in a liquid state go straight to a gaseous state, leaks cannot be detected by simple methods such as examining lines for leaking fluid. The data reporting and trending process 800 also includes steps for leak detection fill level readings 835/840, identify leak 845, and transmit leak detection 850. In an illustrative embodiment, leaks are identified by measuring 835/840 the fill level 140 over a period of time delay 837 while the container is not being used, e.g. during the late night hours. A leak is determined based on a delta in the measurements 845. The requisite delta is specific to the container size and type. For example, if the measurements of an approximately 273 pound empty and approximately 750 pounds full container are taken four hours apart and there is a delta of 4 pounds, a pound an hour is being lost and thus there is a leak in the container system. Given that wireless transceiver 350 usage plays a significant role in diminishing battery life, battery life is preserved by not sending out leak measurement data 850 unless a leak is identified in step 845. If a leak is detected at step 845, then the cell modem is activated and an alarm message is sent to the remote monitoring system 380 in step 850. The alarm message ultimately gets sent out to the drivers and manager or supervisor of the fill supplier.

If a transmission fails at step 820, the fill level indicator system 150 will attempt to retry transmitting the fill level 815 with a time delay between transmissions. For example, a failed transmission may result in the reading being stored 820 and then 4 subsequent transmission attempts at step 820 may be made. If a requisite number of transmission attempts 820 take place with no success, the fill level indicator 150 will attempt to transmit the stored reading per the next normal operation according to the reporting schedule 805.

Figure 12:
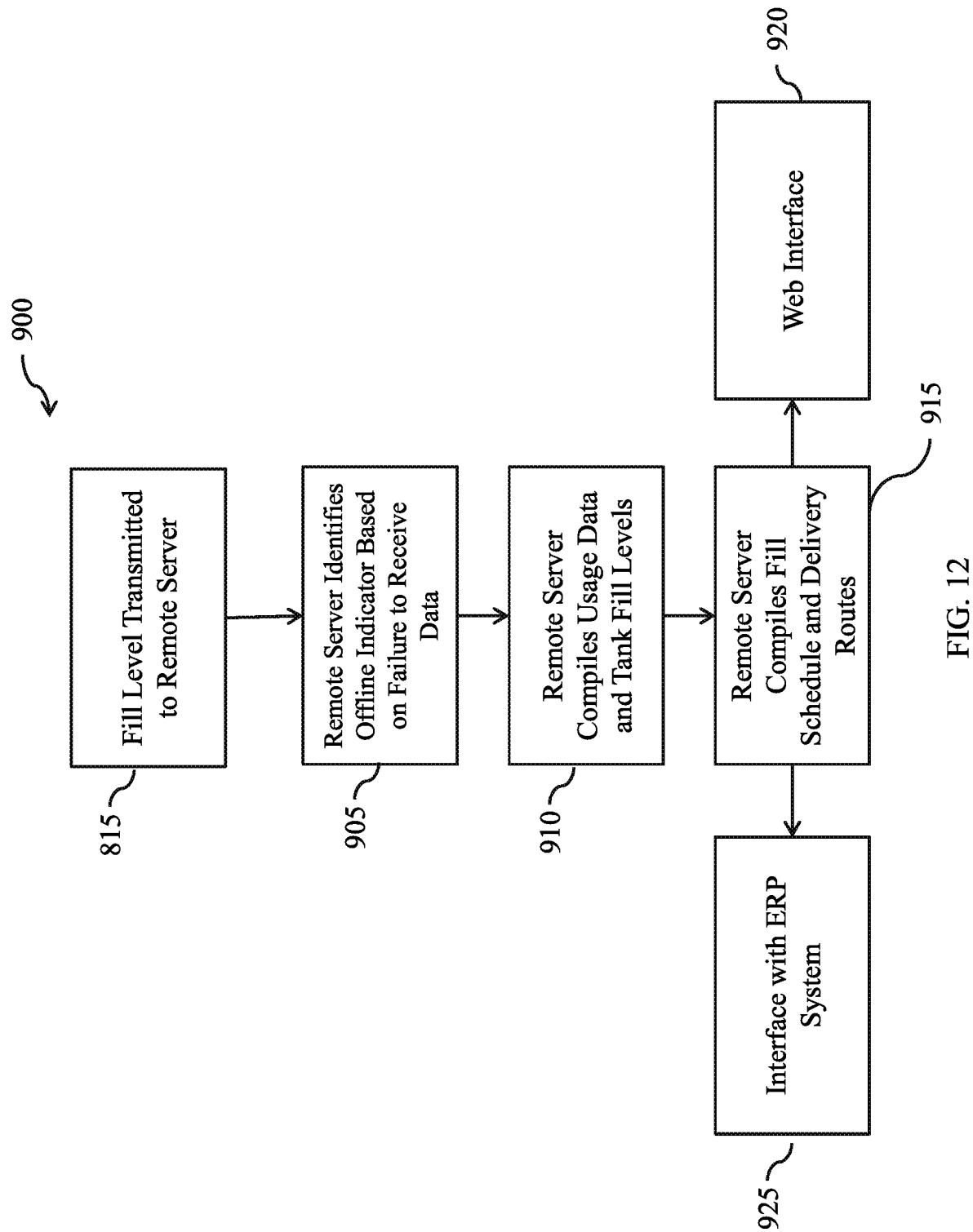
FIG. 12 is a process diagram of an illustrative embodiment of the data trending method according to the present invention.

As shown in FIG. 12, an illustrative process associated with a data analysis method 900 according to the present invention includes the following steps: fill level transmitted to remote server in step 815, the server 380 identifies offline indicator based on failure to receive data 380 in step 905, the server 380 compiles usage data and tank fill levels in step 910, the server 380 compiles fill schedule and delivery routes in step 915, analysis is viewed via a web interface in step 920, and the server 380 interfaces with ERP systems in step 925.

Figure 13:
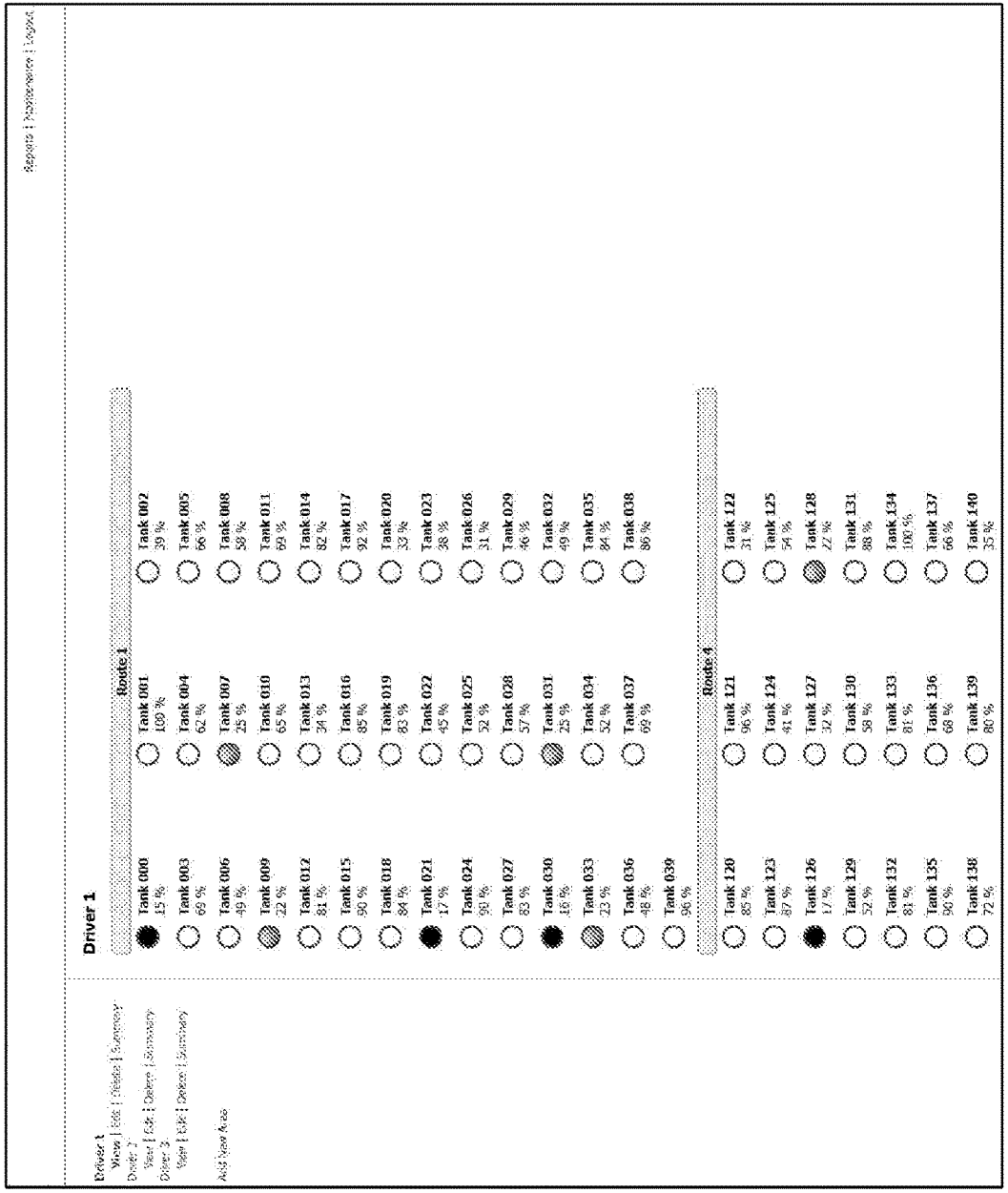
FIG. 13 is an illustrative screen display produced by the methods and systems of the present disclosure.
Figure 15:
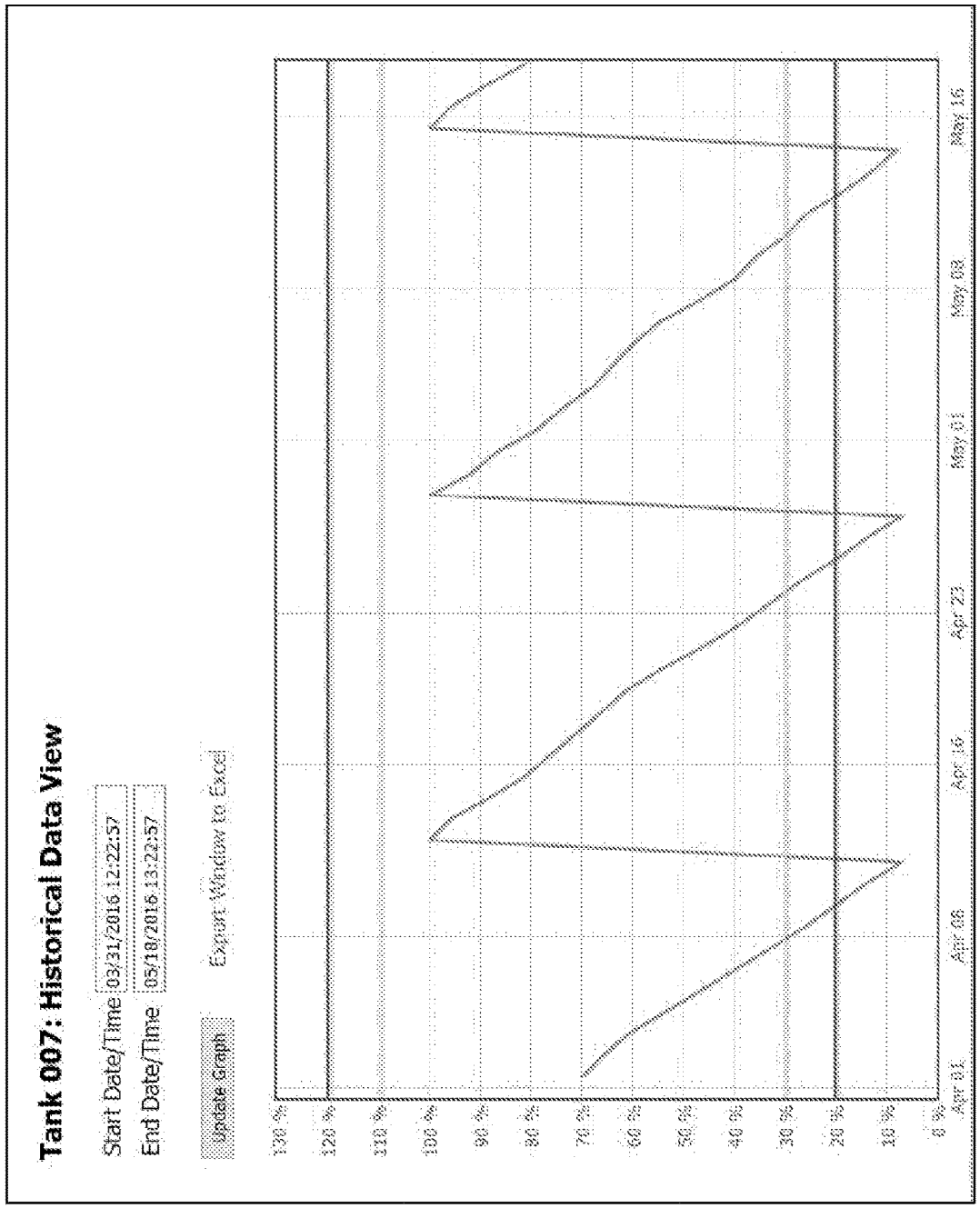
FIG. 15 is an illustrative history graph produced by the methods and systems of the present disclosure.

In steps 920 and 925 and as shown in the illustrative screen display of FIG. 13 and illustrative report of FIG. 14, usage data, including current tank fill level and estimated days until the tank reaches an empty state, can be displayed by a particular driver and/or driver's route so the driver can readily identify tank fill levels and prioritize tank refilling. Additionally, as shown in the illustrative history graph of FIG. 15, historical data for one or more tanks can be displayed in a fill level versus time graph over a specified date range.

In an illustrative embodiment, the fill level indicator 200 of an illustrative embodiment can be configured to report back to the server 380 at a specified frequency, e.g. frequency ranges anywhere from once an hour to once a month, Users can customize reporting to view, sort, or filter compiled data in a variety of different ways in steps 920/925. For example, data can be view based on a particular container 110, a particular driver, or a particular driver's route. Users can also define report or event triggers, such as predictive fill dates. An offline alarm function provides user notification that a fill indicator has not reported on schedule in step 905. In an illustrative embodiment, the server sends an alert to a driver in step 925 to check the device and troubleshoot any number of exemplary problems, including dead batteries, vandalism, or environmentally related issues such as a lightning strike.

Data processing 900 can be performed on the indicator 200 or at the server 380 level. In an illustrative embodiment, data is tracked and trended in step 910 at the server level in such a way that users can access the server 380 and see information at step 910, including usage and fill levels. An illustrative typical user may be a fill service provider, but could also be an end user of the container 110. The ability to view this information remotely in steps 920/925 allows users to eliminate wasted trips to check fill level or fill unnecessarily when the level is not low, thereby eliminating associated wasted costs such as driver time, fill equipment time, and any safety or equipment risks that may be associated with the supplier refill process. As an example, a low fill level that would normally trigger a refill based solely on level may be identified by the server 380 as having a low usage rate, therefore not in a critical refill state. Alternatively, a container 110 having a higher level may be identified for refilling based on a history of high usage rate, thereby eliminating a potential situation where a container runs dry. By utilizing usage data, fill levels, and contents of delivery trucks, the server 380 can optimize driver's fill routes at step 915 based on factor such as priority fill sites, minimal number of miles travelled, shortest amount of time, or even smallest number of left turns.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A tank-in-tank container fill level indicator for a container having a rigid outer tank, a rigid inner tank, and a space therebetween comprising:
an electromechanical device for vibrating an outer surface of the outer tank, the electromechanical device adapted to be coupled to the outer surface of the outer tank, the vibration of the outer tank inducing a resonant vibration of the inner tank;
a vibration detecting device for detecting and transmitting a data signal including a resultant beat envelope of the inner and outer tanks' two separate resonant vibrations detected at the outer tank; and
a data processing device for receiving the data signal from the vibration detecting device and analyzing the resultant beat envelope to determine the container fill level.

2. The tank-in-tank container fill level indicator as recited in claim 1, wherein the electromechanical device is noninvasively coupled to the outer surface of the outer tank.

3. The tank-in-tank container fill level indicator as recited in claim 1, wherein the electromechanical device comprises a vibration device.

4. The tank-in-tank container fill level indicator as recited in claim 3, wherein the electromechanical device comprises a sound exciter.

5. The tank-in-tank container fill level indicator as recited in claim 1, wherein the electromechanical device vibrates the outer surface of the outer tank of the container at the outer tank's resonant frequency.

6. The tank-in-tank container fill level indicator as recited in claim 1, wherein the vibration detecting device is noninvasively coupled to the outer surface of the outer tank.

7. The tank-in-tank container fill level indicator as recited in claim 1, wherein the vibration detecting device includes a low-pass filter.

8. The tank-in-tank container fill level indicator as recited in claim 1, wherein the vibration detecting device is an accelerometer, and is adapted to detect and transmit a data signal including the resultant beat envelope.

9. The tank-in-tank container fill level indicator as recited in claim 1, wherein the electromechanical device and the vibration detecting device are a single dual function device.

10. The tank-in-tank container fill level indicator as recited in claim 1, wherein the data processing device comprises a microcontroller, and includes storage for storing corresponding data and volume information.

11. The tank-in-tank container fill level indicator as recited in claim 1, further comprising a display to provide the container fill level.

12. The tank-in-tank container fill level indicator as recited in claim 1, further comprising at least one ambient environmental sensor.

13. The tank-in-tank container fill level indicator as recited in claim 1, further comprising at least one user interface to interact with the data processing device.

14. The tank-in-tank container fill level indicator as recited in claim 1, wherein the data processing device further comprises an analog to digital converter for processing a signal received from the vibration detecting device.

15. The tank-in-tank container fill level indicator as recited in claim 1, wherein the data processing device further comprises an analog processing circuit to remove a high frequency component from the data signal received from the vibration detecting device.

16. The tank-in-tank container fill level indicator as recited in claim 1, wherein the data processing device further comprises an envelope tracker to analyze a beat component of the data signal.

17. The tank-in-tank container fill level indicator as recited in claim 1, further comprising a battery power source.

18. The tank-in-tank container fill level indicator as recited in claim 1, further comprising a switched voltage PWM power supply.

19. The tank-in-tank container fill level indicator as recited in claim 1, further comprising a wireless data transceiver to transmit container fill level information.

20. The tank-in-tank container fill level indicator as recited in claim 19, wherein the wireless data transceiver utilizes W-Fi local area wireless computer networking technology.

21. The tank-in-tank container fill level indicator as recited in claim 19, wherein the wireless data transceiver utilizes cellular broadband technology.

22. The tank-in-tank container fill level indicator as recited in claim 19, further comprising a remotely located processor having control software for configuring, monitoring, and controlling the tank-in-tank container fill level indicator, and wherein the wireless data transceiver is capable of communicating with the remotely located processor.

23. The tank-in-tank container fill level indicator as recited in claim 22, wherein a user can access the remotely located processor via a user computing device.

24. The tank-in-tank container fill level indicator as recited in claim 22, wherein the remotely located processor includes a server.

25. The tank-in-tank container fill level indicator as recited in claim 24, wherein the server is a cloud server.

26. The tank-in-tank container fill level indicator as recited in claim 1, wherein the electromechanical device and vibration detecting device are packaged within a common housing.

27. The tank-in-tank container fill level indicator as recited in claim 26, wherein the common housing is adapted to withstand outdoor weather conditions.

28. The tank-in-tank container fill level indicator as recited in claim 1, wherein the data processing device is packaged in a first housing and the electromechanical device and vibration detecting device are packaged in a second housing.

29. The tank-in-tank container fill level indicator as recited in claim 28, wherein the first housing is adapted to couple to a handle of the outer tank.

30. A tank-in-tank container fill level indicator for a container having a rigid outer tank, a rigid inner tank, and a space therebetween comprising:
   a sound exciter for vibrating an outer surface of the outer tank, the sound exciter adapted to be coupled to the outer surface of the outer tank, the vibration of the outer tank inducing a resonant vibration of the inner tank;
   a vibration detecting device for detecting and transmitting a data signal indicative of a resultant beat envelope of the inner and outer tanks' two separate resonant vibrations detected at the outer tank; and
   a data processing device for receiving the data signal from the vibration detecting device and analyzing the resultant beat envelope to determine the container fill level.

31. The tank-in-tank container fill level indicator of claim 30, wherein the sound exciter vibrates the outer surface of the outer tank of the container at the outer tank's resonant frequency.

32. The tank-in-tank container fill level indicator as recited in claim 30, wherein the sound exciter and vibration detecting device are noninvasively coupled to the outer surface of the outer tank.

33. The tank-in-tank container fill level indicator as recited in claim 30, wherein the vibration detecting device is an accelerometer.

34. The tank-in-tank container fill level indicator as recited in claim 30, further comprising a display to provide the container fill level.

35. The tank-in-tank container fill level indicator as recited in claim 30, wherein the data processing device further comprises an envelope tracker to analyzing the resultant beat envelope.

36. The tank-in-tank container fill level indicator as recited in claim 30, further comprising a wireless data transceiver to transmit container fill level information.

37. The tank-in-tank container fill level indicator as recited in claim 36, wherein the wireless data transceiver utilizes cellular broadband technology.

38. The tank-in-tank container fill level indicator as recited in claim 36, further comprising a remotely located processor having control software for configuring, monitoring, and controlling the tank-in-tank container fill level indicator, and wherein the wireless data transceiver is capable of communicating with the remotely located processor.

39. The tank-in-tank container fill level indicator as recited in claim 38, wherein the remotely located processor includes a server.

40. The tank-in-tank container fill level indicator as recited in claim 30, wherein the data processing device is packaged in a first housing and the sound exciter and vibration detecting device are packaged in a second housing.

41. The tank-in-tank container fill level indicator as recited in claim 40, wherein the first housing is adapted to couple to a handle of the outer tank.

* * * * *